United States Patent [19]

Nishio et al.

[11] Patent Number: 5,076,201
[45] Date of Patent: Dec. 31, 1991

[54] DEVELOPING DEVICE USED IN ELECTROPHOTOGRAPHIC FIELD AND METHOD OF PRODUCING DEVELOPING ROLLER INCORPORATED THEREIN

[75] Inventors: Yukio Nishio, Tama; Kazunori Hirose, Hiratsuka; Yasuhiro Tukui, Kawasaki, all of Japan

[73] Assignee: Fujitsu Limited, Kawasaki, Japan

[21] Appl. No.: 493,536

[22] Filed: Mar. 14, 1990

[30] Foreign Application Priority Data

| Mar. 16, 1989 | [JP] | Japan | 1-62026 |
| Mar. 17, 1989 | [JP] | Japan | 1-66627 |
| Apr. 25, 1989 | [JP] | Japan | 1-104975 |
| Apr. 28, 1989 | [JP] | Japan | 1-110322 |
| May 31, 1989 | [JP] | Japan | 1-138509 |
| Jul. 7, 1989 | [JP] | Japan | 1-176540 |

[51] Int. Cl.$^5$ .............................................. G03G 15/08
[52] U.S. Cl. ..................................... 118/653; 355/259
[58] Field of Search ................ 355/259, 245; 118/651, 118/653

[56] References Cited

U.S. PATENT DOCUMENTS

| 4,378,158 | 3/1983 | Kanbe | 118/651 X |
| 4,564,285 | 1/1986 | Yasuda et al. | 118/651 X |
| 4,788,570 | 11/1988 | Ogata et al. | 355/245 |
| 4,827,868 | 5/1989 | Tarumi et al. | 118/653 |
| 4,910,556 | 3/1990 | Namaki | 118/651 X |

FOREIGN PATENT DOCUMENTS

| 53-138349 | 12/1978 | Japan . |
| 54-137346 | 10/1979 | Japan . |
| 55-77764 | 6/1980 | Japan . |
| 57-120947 | 7/1982 | Japan . |
| 60-6846 | 3/1985 | Japan . |
| 60-12627 | 4/1985 | Japan . |
| 61-43767 | 3/1986 | Japan . |
| 62-976 | 1/1987 | Japan . |
| 62-96981 | 5/1987 | Japan . |
| 62-118372 | 5/1987 | Japan . |
| 62-138874 | 6/1987 | Japan | 355/259 |
| 62-269977 | 11/1987 | Japan | 355/259 |
| 63-98679 | 4/1988 | Japan | 355/259 |
| 63-100482 | 5/1988 | Japan . |
| 63-189876 | 8/1988 | Japan . |
| 63-231469 | 9/1988 | Japan . |
| 1-90475 | 4/1989 | Japan | 355/259 |

Primary Examiner—R. L. Moses
Attorney, Agent, or Firm—Armstrong, Nikaido, Marmelstein, Kubovcik & Murray

[57] ABSTRACT

A developing device using a one-component developer composed of colored fine sythetic resin toner particles, which device comprises a vessel for holding the developer, and a developing roller rotatably provided within the vessel in such a manner that a portion of the roller is exposed therefrom and resiliently pressed against a surface of an electrostatic latent image formation drum. The roller is formed of a conductive porous rubber material so that pore openings appear over a surface of the roller, and the pore openings have a diameter which is at most twice an average diameter of the toner particles, whereby during rotation of the roller, the toner particles are captured and held by the pore openings of the roller to form a developer layer therearound and are carried to the surface of the drum. The developing device further comprises a blade or roller member provided within the vessel and resiliently engaged with the developing roller, for regulating a thickness of the developer layer formed around the developing roller.

57 Claims, 21 Drawing Sheets

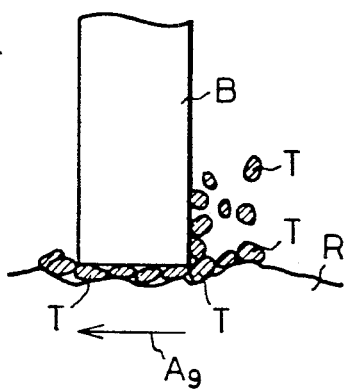
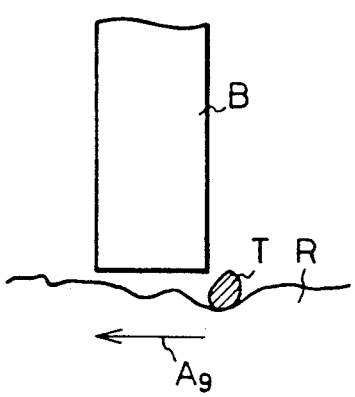
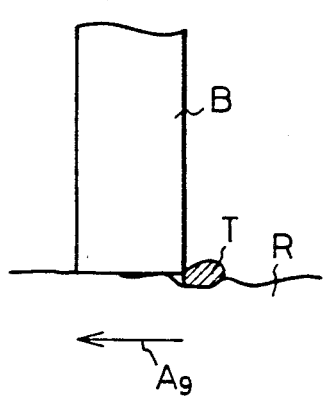
Fig.6a PRIOR ART  Fig.6b PRIOR ART  Fig.6c PRIOR ART
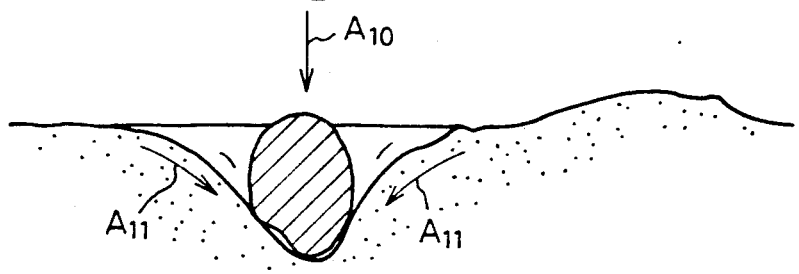
Fig.7a PRIOR ART
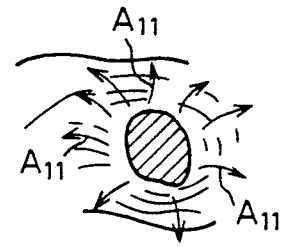
Fig.7b PRIOR ART

POLYESTER TONER PARTICLES

STYRENE ACRYLIC TONER PARTICLES

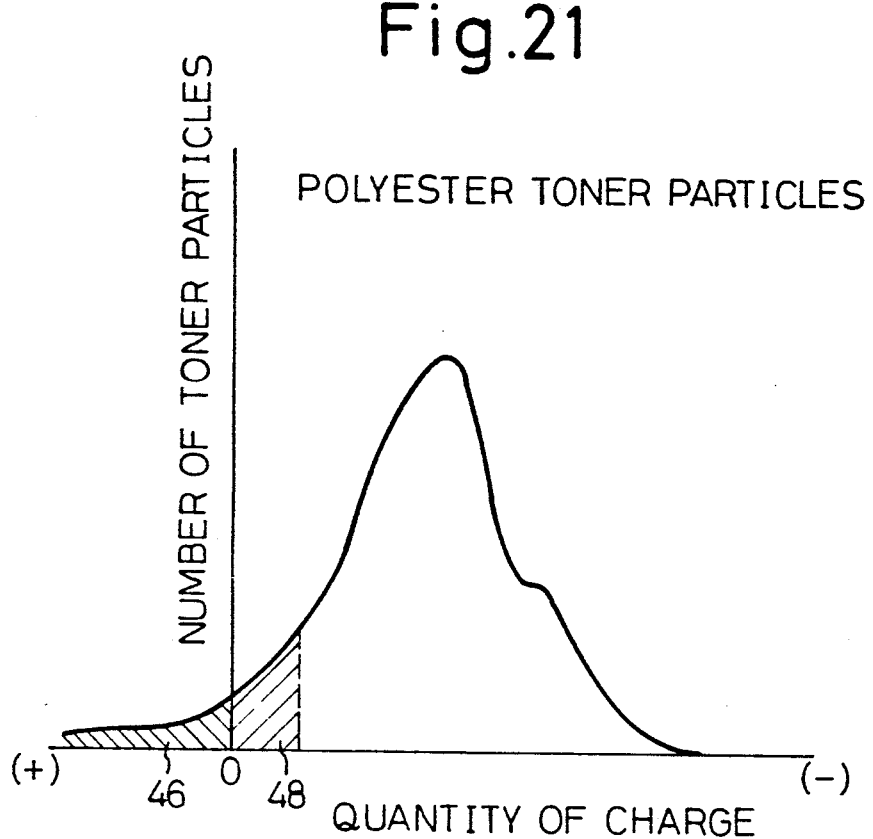
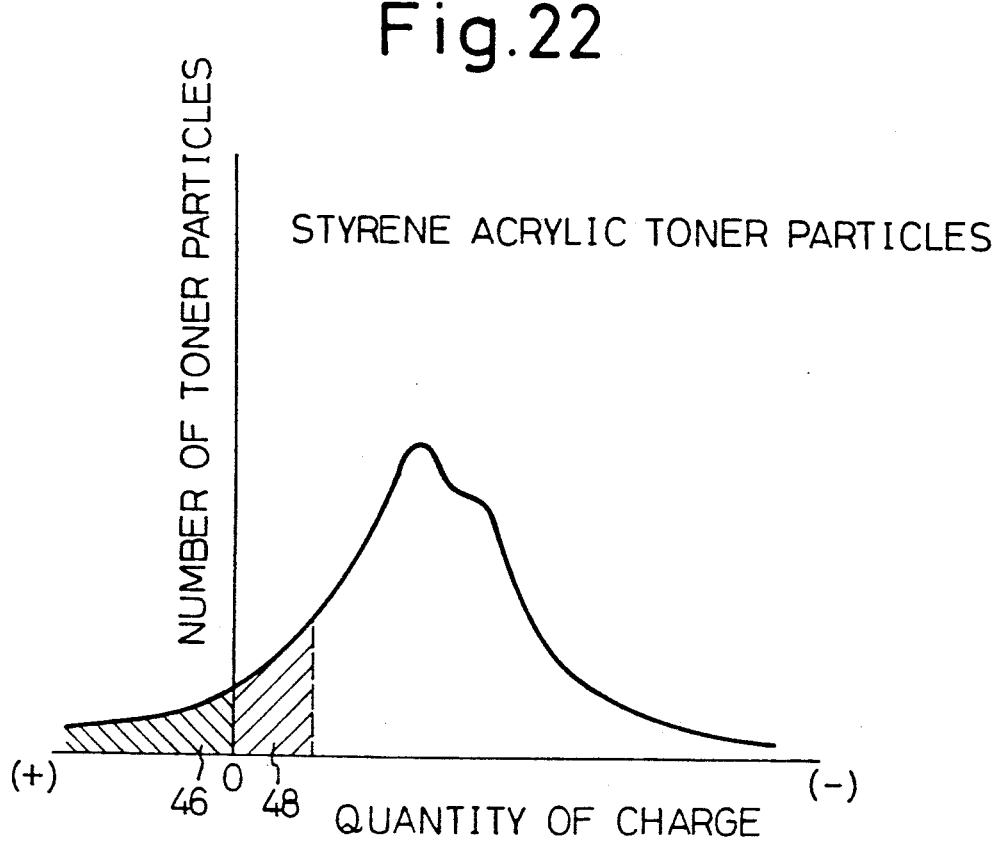

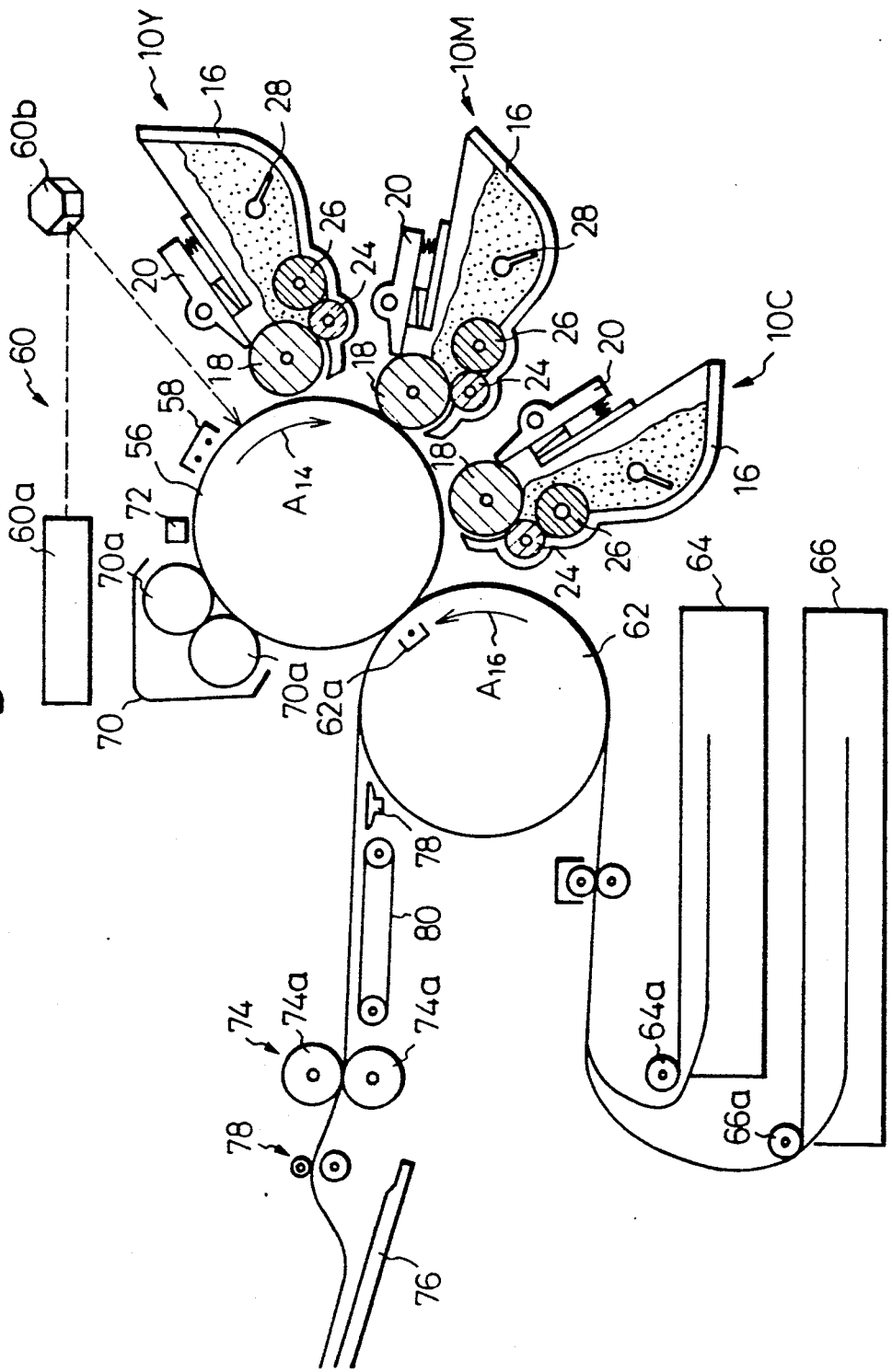

DEVELOPING DEVICE USED IN ELECTROPHOTOGRAPHIC FIELD AND METHOD OF PRODUCING DEVELOPING ROLLER INCORPORATED THEREIN

BACKGROUND OF THE INVENTION

1) Field of the Invention

The present invention relates to a developing device used in an electrophotographic field, wherein an electrostatic latent image is visually developed by using a one-component developer. The present invention also relates to a method of producing a developing roller incorporated into the above developing device.

2) Description of the Related Art

As is well known, an electrophotographic printer carries out the processes of: producing a uniform distribution of electrical charges on a surface of an electrostatic latent image carrying body such as an electrophotographic photoreceptor; forming an electostatic latent image on the electrically charged surface of the electrophotographic photoreceptor by optically writing an image thereon by using a laser beam scanner, an LED (light emitting diode) array, a liquid crystal shutter array or the like; visually developing the electrostatic latent image with a developer, i.e., toner, which is electrically charged to be electrostatically adhered to the electostatic latent image zone; electrostatically transferring the developed visible image to a paper; and fixing the transferred image on the paper. Typically, the electrophotographic photoreceptor is formed as a drum, called a photosensitive drum, having a cylindrical conductive substrate and a photoconductive insulating film bonded to a cylindrical surface thereof.

In the developing process, a two-component developer composed of a toner component (colored fine synthetic resin particles) and a magnetic component (magnetic fine carriers) is widely used as it enables a stable development of the latent image. Note, typically the toner particles have an average diameter of about 10 μm, and the magnetic have a diameter ten times larger than the average diameter of the toner particles. Usually, a developing device using the two-component developer includes a vessel for holding the two-component developer, wherein the developer is agitated by an agitator provided therein. This agitation causes the toner particles and the magnetic carriers to be subjected to triboelectrification, whereby the toner particles are electrostatically adhered to each of the magnetic carriers. The developing device also includes a magnetic roller provided with in the vessel as a developing roller in such a manner that a portion of the magnetic roller is exposed therefrom and faces the surface of the photosensitive drum. The magnetic carriers with the toner particles are magnetically adhered to the surface of the magnetic roller to form a magnetic brush therearound, and by rotating the magnetic roller carrying the magnetic brush, the toner particles are brought to the surface of the photosensitive drum for the development of the electrostatic latent image formed theron. In this developing device, a ratio between the toner and magnetic components of the developer body held in the vessel must fall within a predetermined range to continuously maintain a the stable development process. Accordingly, the developing device is provided with a toner supplier from which a toner component is supplied to the two-component developer held in the vessel, to supplement the toner component as it is consumed during the development process, whereby the component ratio of the two-component developer held by the vessel is kept within the predetermined range. This use of a two-component developer is advantageous in that a stable development process is obtained thereby, but the develop-ing device per se has the disadvantages of a cumbersome control of a suitable component ratio of the two-component developer, and an inability to reduce the size of the developing device due to the need to incorporate the toner supplier therein.

A one-component developer is also known in this field, and a developing device using same does not suffer from the above-mentioned disadvantages of the developing device using the two-component developer because the one-component developer is composed of only a toner component (colored fine synthetic resin particles). Two types of the one-component developer are known; a magnetic type and a non-magnetic type. A developing device using the magnetic type one-component developer can be constructed in substantially the same manner as that using the two-component developer. Namely, the magnetic type one-component developer also can be brought to the surface of the photosensitive drum by a rotating magnetic roller as in the developing device using the two-component developer. The magnetic type one-component developer is suitable for achromatic color (black) printing, but is not suitable for chromatic color printing. This is because each of the toner particles of which the magnetic type one-component developer is composed includes fine magnetic powders having a dark color. In particular, the chromatic color printing obtained from the magnetic type one-component developer appears dark and dull, due to the fine magnetic powders included therein. Conversely, the non-magnetic type one-component developer is particularly suitable for chromatic color printing because it does not include a substance having a dark color, but the non-magnetic type one-component developer cannot be brought to the surface of the photosensitive drum by the magentic roller as mentioned above.

A developing device using the non-magnetic type one-component developer is also known, as disclosed in U.S. Pat. No. 3,152,012 and U.S. Pat. No. 3,754,963. This developing device includes a vessel for holding the non-magnetic type one-component developer, and a conductive elastic solid roller provided within the vessel as a developing roller in such a manner that a portion of the elastic roller is exposed therefrom and can be pressed against the surface of the photosensitive drum. The conductive elastic solid developing roller may be formed of a conductive silicone rubber material or a conductive polurethane rubber material, as disclosed in Japanese Examined Patent Publication (Kokoku) No. 60-12627 and Japanese Unexamined Patent Publications (Kokai) No. 62-118372 and No. 63-189876. When the conductive solid rubber roller is rotated within the body of the non-magnetic type one-component developer held by the vessel, the toner particles composing the non-magnetic type one-component developer are frictionally entrained by the surface of the conductive solid rubber developing roller to form a developer layer therearound, whereby the toner particles can be brought to the surface of the photosensitive drum for the development of the electrostatic latent image formed thereon. The developing device further includes a blade member engaged with the surface of the developing roller, to uniformly regulate a thickness of the developer layer formed therearound so that an even development of the latent image can be carried out. The blade member also serves to electrically charge the toner particles by a triboelectrification therebetween. In this developing device, the development process is carried out in such a manner that, at the area of contact between the photosensitive drum and the conductive solid rubber developing roller carrying the developer layer, the charged toner particles are electrostatically attracted and adhered to the latent image due to a bias voltage applied to the conductive solid rubber developing roller.

In the above-mentioned developing device using the non-magnetic type one-component developer, a coefficient of the surface friction of the conductive solid rubber developing roller is changed by variations in the environment, particularly in the temperature and air moisture content. If the friction coefficient of the conductive solid rubber developing roller becomes low, an amount of the toner particles necessary for the development of the latent image cannot be entrained by the developing roller. Japanese Examined Utility Model Publication (Kokoku) No. 60-6846 discloses a solid rubber developing roller having a rough surface by which the toner particles can be sufficiently entrained even though the friction coefficient thereof becomes low, but as discussed hereinafter in detail, when a coefficient of friction of the toner particles becomes large, the toner particles entrained by the rough surface of the solid rubber developing roller may be removed therefrom by the blade member regulating the thickness of the developer layer formed on the developing roller.

To achieve a proper development of the latent image by the developing rubber roller, an elasticity or hardness of the developing roller is an important parameter, because the development quality and the development toner density are greatly affected by a contact or nip width between the photosensitive drum and the solid rubber developing roller pressed thereagainst. Namely, the developing roller must be pressed against the photosensitive drum so that a given nip width by which a proper development is obtained and is established therebetween. The conductive silicone or polyurethane solid rubber developing roller has a relatively high hardness. For example, when measured by an Asker C-type hardness meter, the solid rubber developing roller showed an Asker C-hardness of about 58°. Accordingly, the solid rubber developing roller must be pressed against the photosensitive drum with a relatively high pressure to obtain the required nip width therebetween, but the higher the pressure exerted upon the photosensitive drum by the developing roller, the greater the premature wear of the drum. Japanese Unexamined Patent Publication No. 63-231469 discloses a developing roller comprising a sponge roller element covered with a silicone solid rubber layer, whereby a penetration of the toner particles into the sponge roller element is prevented. This developing sponge roller is softer than the solid rubber developing roller, and thus the required nip width between the developing roller and the photosensitive drum can be obtained without exerting a high presure upon the drum. Nevertheless, the production of the sponge developing roller is costly due to the complex construction thereof. Also, since the sponge developing roller per se has a solid surface provided by the silicone solid rubber layer, the entrainment of the toner particles thereby is greatly affected by variations of the temperature and air moisture content, as mentioned above.

Furthermore, the developing device using the non-magnetic type one-component developer must constituted in such a manner that the toner particles can be given a charge distribution that will produce a proper development of a latent image, since if this is not ensured, an electrophotographic fog may appear during the development process and the developer be wastefully consumed for the reasons stated hereinafter in detail. Also, the developing device is preferably constituted in such a manner that the charge distribution ensuring a proper development of a latent image is stably obtained without and is not affected by variations of the temperature and air moisture content.

SUMMARY OF THE INVENTION

Therefore, an object of the present invention is to provide a developing device using a one-component developer, particularly a non-magnetic type one-component developer used in the electrophotographic field, wherein a developing roller for entraining and bringing the developer particles or toner particles to an electrostatic latent image carrying body such as a photosensitive drum or a dielectric drum, to develop a latent image formed thereon, is improved such that the toner particles can be firmly and stably captured and held thereby and are not affected by variations of the temperature and air moisture content.

Another object of the present invention is to provided a developing device as mentioned above, wherein a hardness of the developing roller is such that the operating life of the electrostatic latent image carrying body as an electrophotographic photoreceptor, against which the developing roller is resiliently pressed, is prolonged and an uneven development of a latent image does not occur.

A further object of the present invention is to provide a developing device as mentioned above, wherein the developing roller is constituted in such a manner that a charge distribution of the toner particles is such that a proper development of a latent image can be obtained regardless of variations of the temperature and air moisture content.

According to the present invention, there is provided adeveloping device using a one-component developer, which device comprises: a vessel for holding a one-component developer composed of toner particles; a developing roller rotatably provided within the vessel in such a manner that a portion of the developing roller is exposed therefrom and faces the surface of an electrostatic latent image carrying body; and the developing roller being formed of a conductive open-cell foam rubber material so that pore openings appear over a surface of the developing roller, the pore openings having a diameter which is at most twice an average diameter of the toner particles, whereby during a rotation of the developing roller, the toner particles are captured and held by the pore openings of the developing roller to form a developer layer therearound and are carried to the surface of the electrostatic latent image carrying body.

Also, according to the present invention, there is provided adeveloping device using a one-component developer, which device comprises: a vessel for holding a one-component developer composed of toner particles; a developing roller rotatably provided within the vessel in such a manner that a portion of the developing roller is exposed therefrom and faces the surface of an electrostatic latent image carrying body; the developing roller being formed of a conductive open-cell foam rubber material so that pore openings appear over a surface of the developing roller, whereby during a rotation of the developing roller, the toner particles are captured and held by the pore openings of the developing roller to form a developer layer therearound and are carried to the surface of the electrostatic latent image carrying body; and the pore opening or porous cells of the developing roller being in communication with each other through fine passages formed among the porous cells, the fine passages having a diameter which is at most twice an average diameter of the toner particles.

In the developing device as mentioned above, the conductive open-cell foam rubber material of which the developing roller is formed may be selected from the group consisting of a conductive open-cell foam polyurethane rubber material, a conductive open-cell foam silicone rubber material, and a conductive open-cell foam acrylonitorile-butadiene rubber material. When the developing roller is resiliently pressed against the surface of the electrostatic latent image carrying body, it is preferable to give the developing roller an Asker C-hardness of at most 50°, preferably 35°, whereby the operating life of the electrostatic latent image carrying body can be prolonged. The developing device may includes a developer layer regulating means provided within the vessel and resiliently engaged with the developing roller for regulating a thickness of the developer layer formed around the developing roller. When the developer layer regulating means is formed of a metal material selected from the group consisting of aluminum, stainless steel, and brass, the developing roller should be given an Asker C-hardness of at most 50°, preferably 35°, so that variations of the developer layer thickness regulated by the developer layer regulating means can be reduced. Preferably, the developing roller is formed of the conductive open-cell foam polyurethane rubber material, whereby a resolution of a developed image can be maintained at a high level and over a long period.

Futhermore, according to the present invention, there is provided a developing device using a one-component developer, which device comprises: a vessel for holding a one-component developer composed of toner particles; a developing roller rotatably provided within the vessel in such a manner that a portion of the developing roller is exposed therefrom and faces the surface of an electrostatic latent image carrying body; the developing roller being formed of a conductive rubber material by which the toner particles are entrained to to form a developer layer therearound and are carried to the surface of the electrostatic latent image carrying body; and a developer layer regulating means provided within the vessel and resiliently engaged with the developing roller for regulating a thickness of the developer layer formed around the developing roller, wherein the developing roller is constituted so that a work function thereof approximates, preferably conforms with, that of the toner particles, and the toner particles are charged by a triboelectrification between the developer layer regulating means and the toner particles, whereby the toner particles can be given a desired charge distribution regardless of variations of temperature and air moisture content. In this developing device, the developing roller is preferably formed of the conductive open-cell foam rubber material so that pore openings appear over a surface of the developing roller, the pore openings having a diameter which is at most twice an average diameter of the toner particles.

Futhermore, according to the present invention, there is provided a developing device using a one-component developer, which device comprises: a vessel for holding a one-component developer composed of toner particles; a developing roller rotatably provided within the vessel in such a manner that a portion of the developing roller is exposed therefrom and faces the surface of an electrostatic latent image carrying body; the developing roller being formed of a conductive rubber material by which the toner particles are entrained to to form a developer layer therearound and are carried to the surface of the electrostatic latent image carrying body; and a developer layer regulating means provided within the vessel and resiliently engaged with the developing roller for regulating a thickness of the developer layer formed around the developing roller, wherein when the toner particles are charged by a triboelectrification between the developing roller and developer layer regulating means and the toner particles, the developing roller and developer layer regulating means are constituted in such a manner that a relationship of work functions $W_1$ and $W_2$ thereof and a work function $W_3$ of the toner particles is defined by the following formula:

$$(W_1-W_3)\times(W_2-W_3)>0$$

whereby the toner particles can be given a desired distribution. In this developing device, the developing roller is preferably formed of the conductive open-cell foam rubber material so that pore openings appear over a surface of the developing roller, the pore openings having a diameter which is at most twice an average diameter of the toner particles.

BRIEF DESCRIPTION OF THE INVENTION

The other objects and advantages of the present invention will be better understood from the following description, with reference to the accompanying drawings, in which.

Figure 8A:
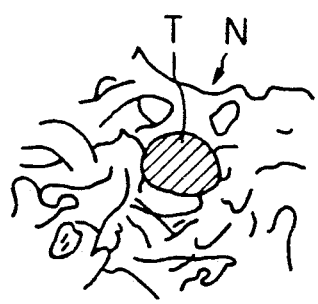
Figure 8B:
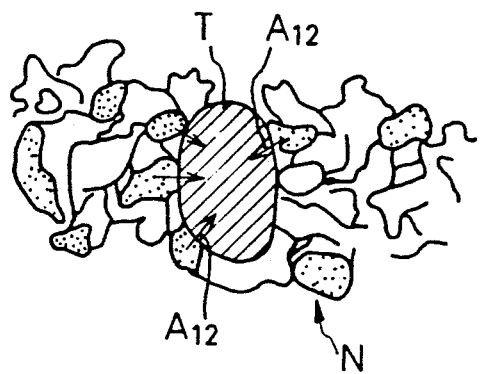
Figure 9:
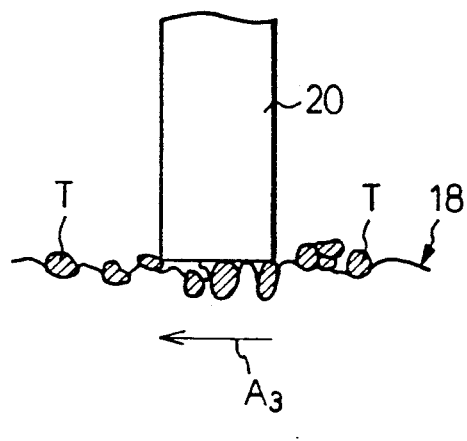
Figure 10:
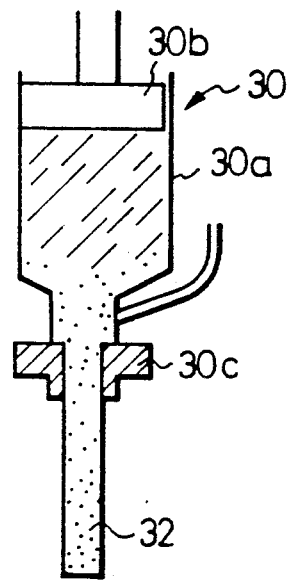
Figure 11:
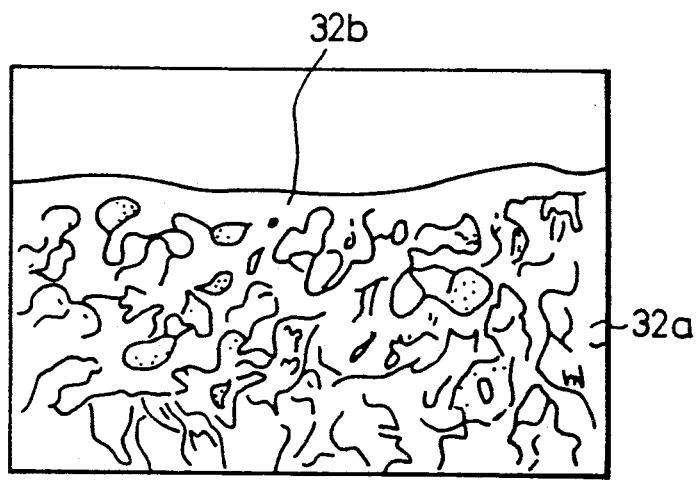
Figure 12:
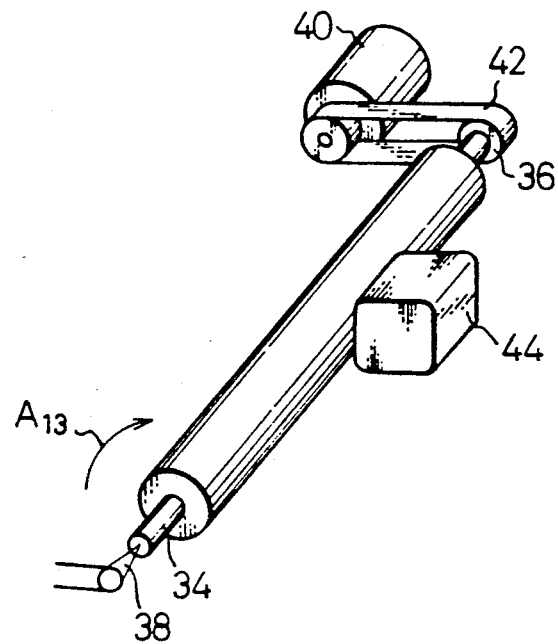
Figure 13:
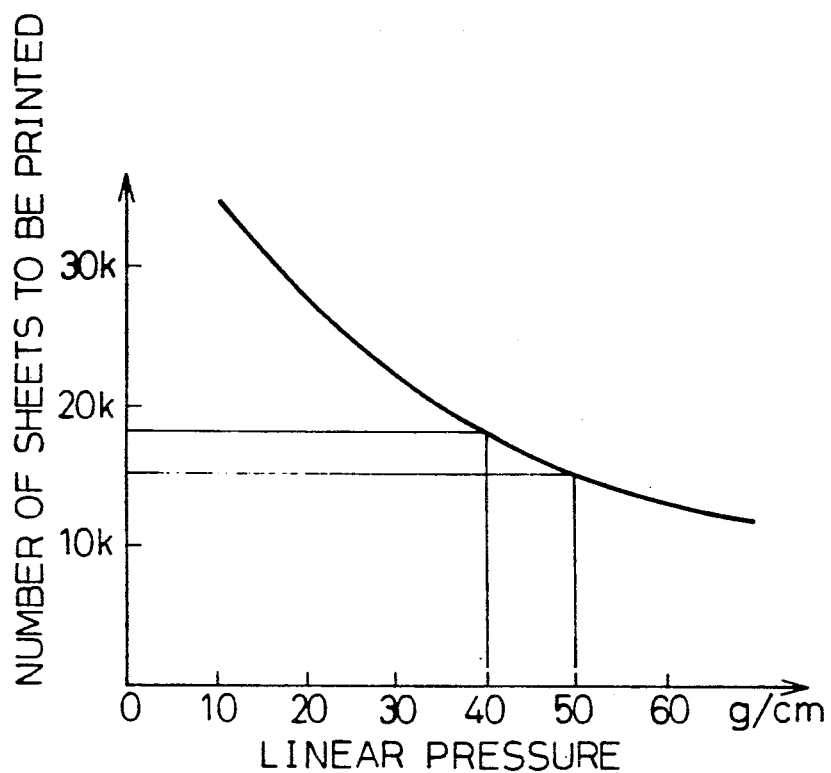
Figure 14:
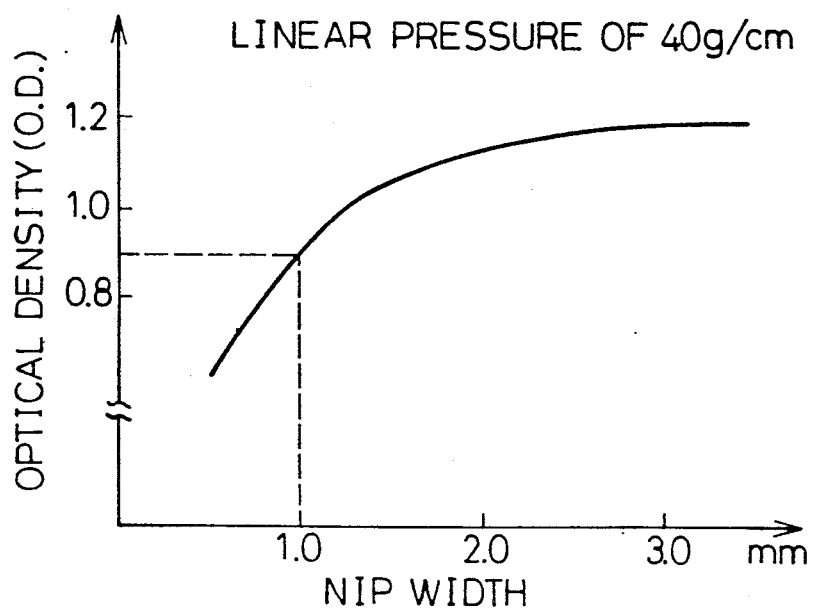
Figure 15:
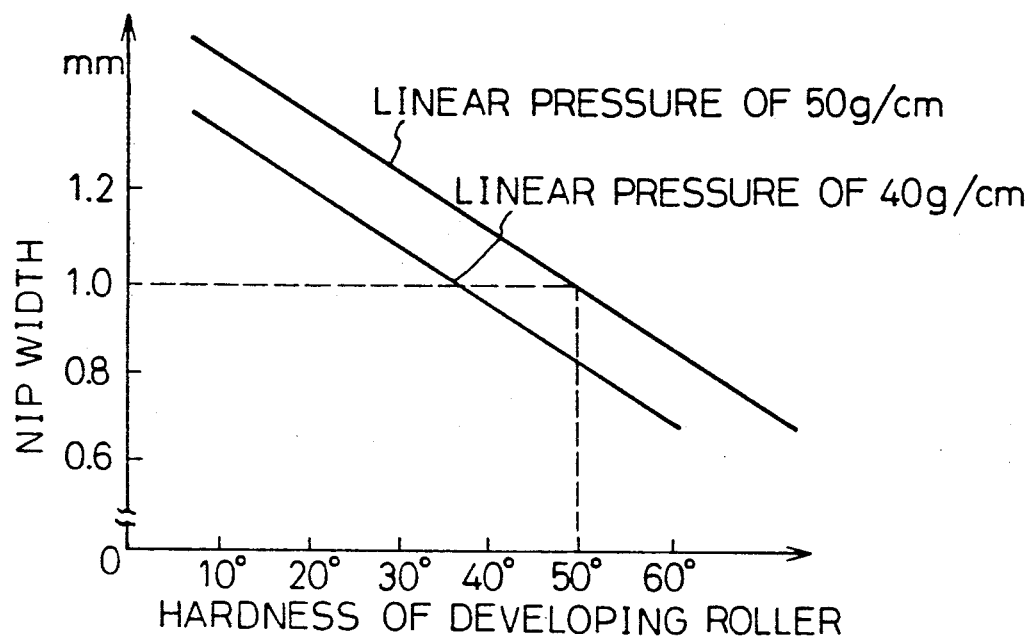
Figure 16:
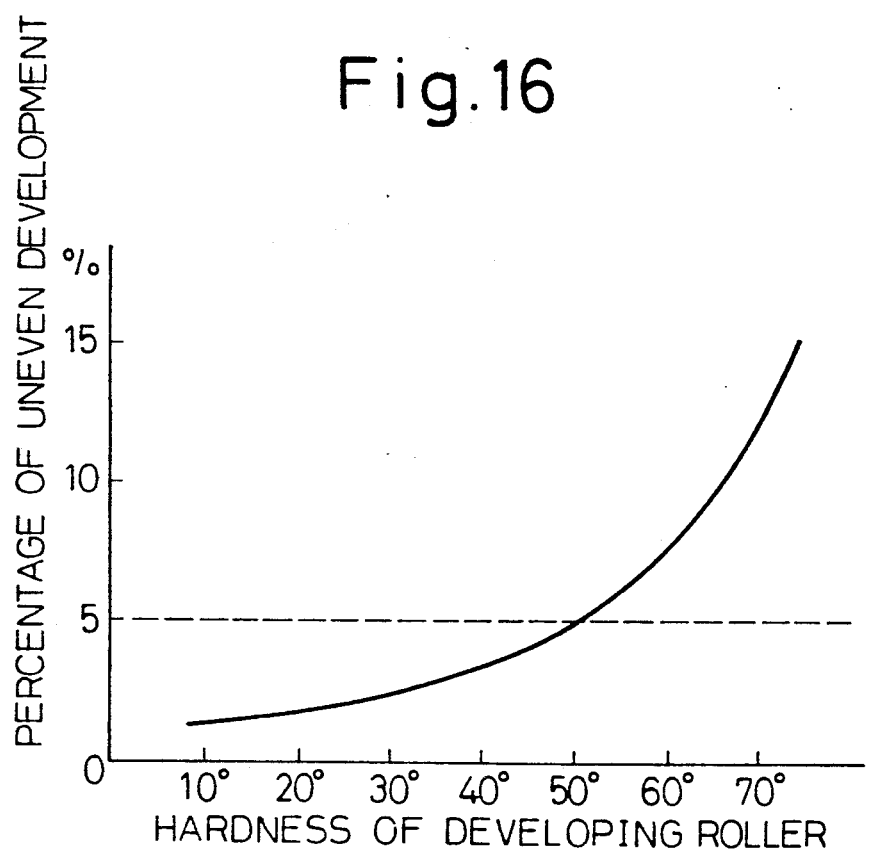
Figure 17:
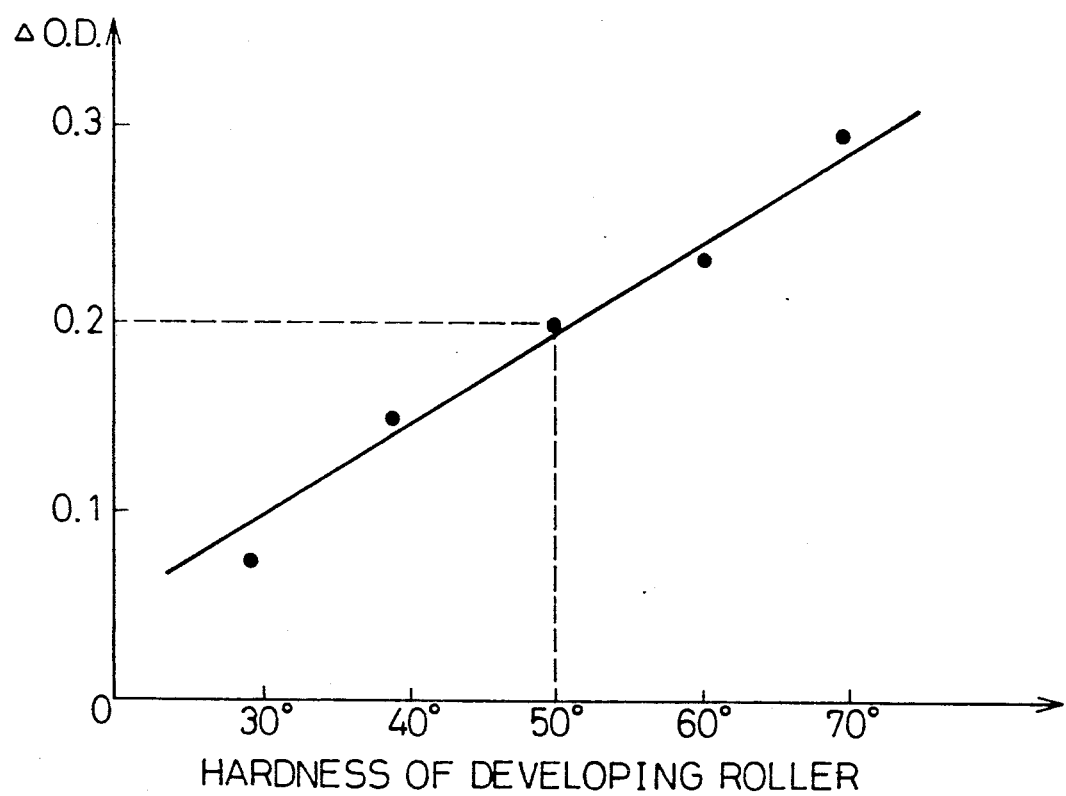
Figure 18:
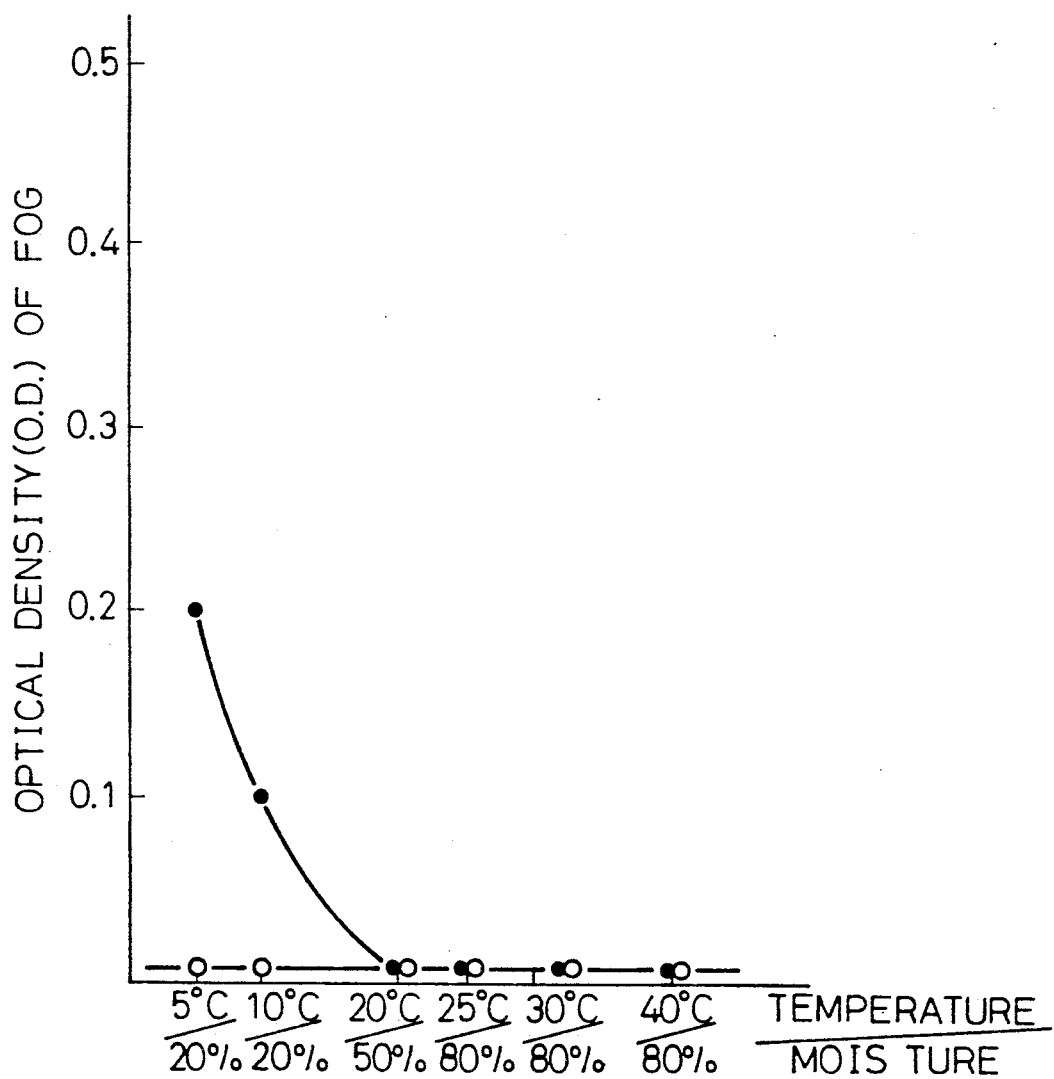
Figure 19:
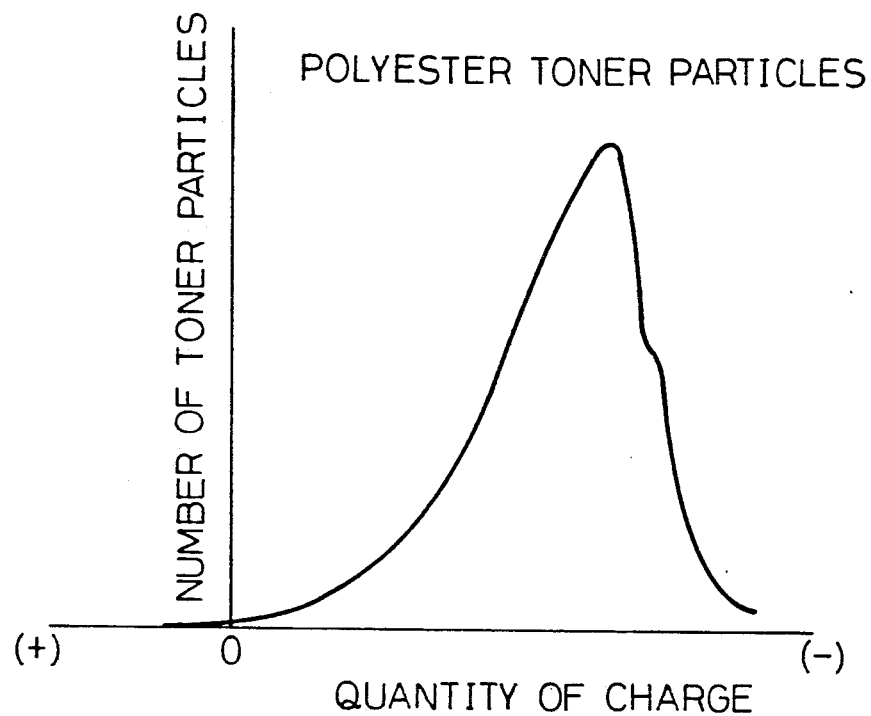
Figure 20:
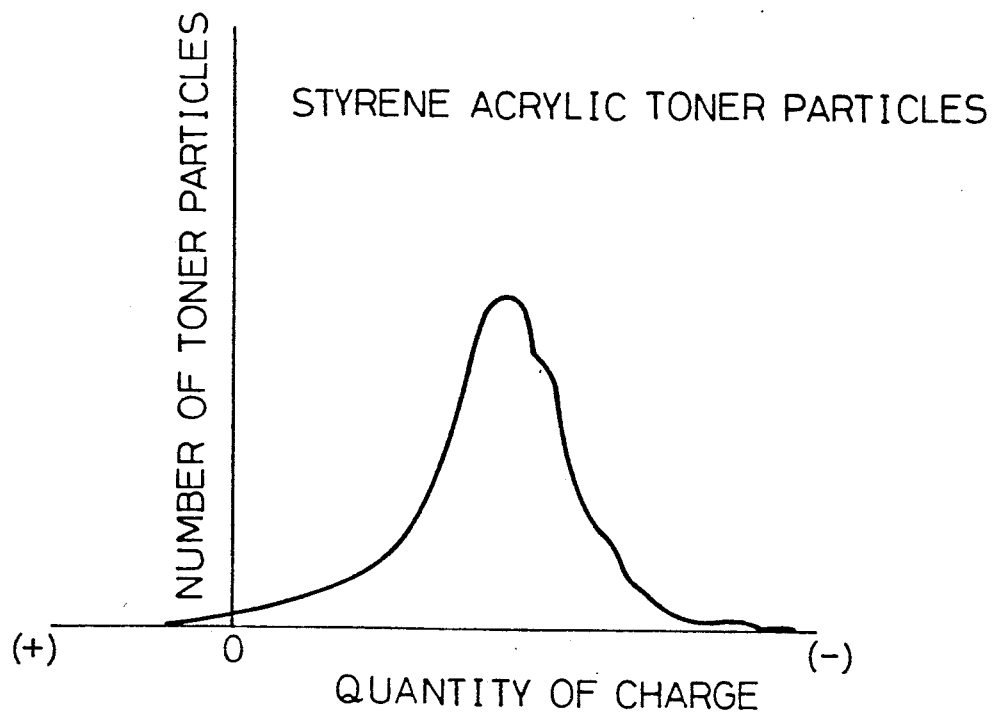
Figure 23:
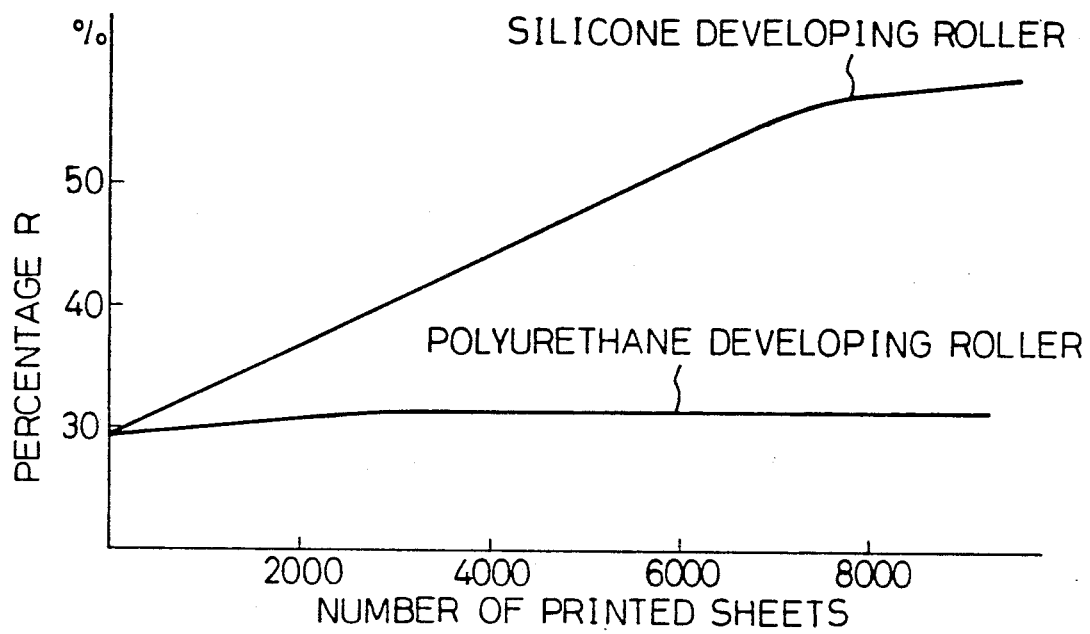
Figure 24:
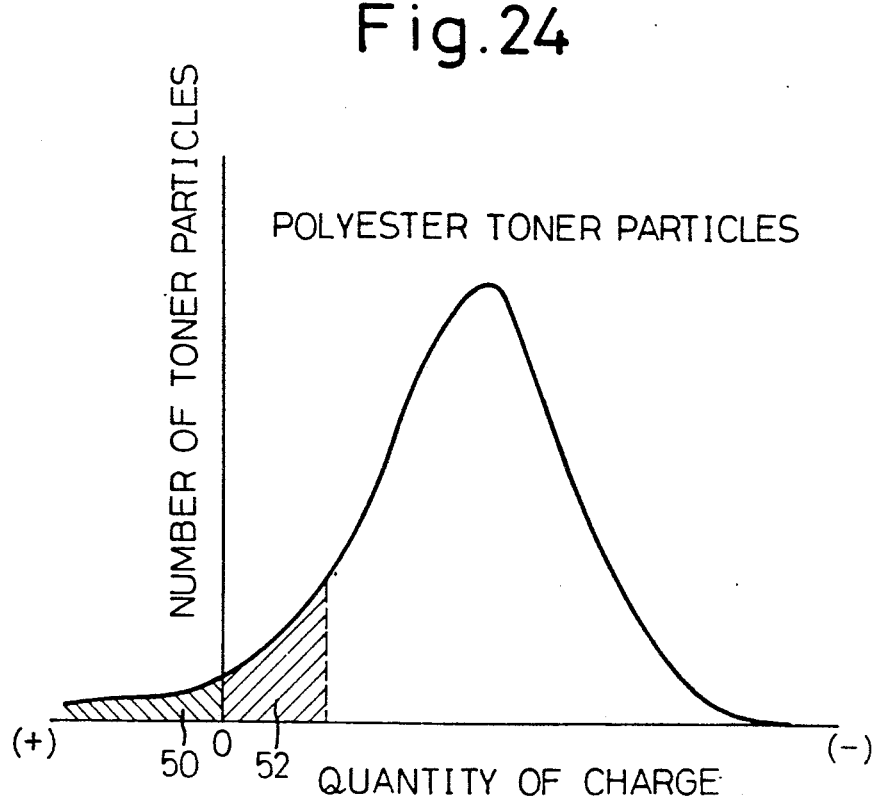
Figure 25:
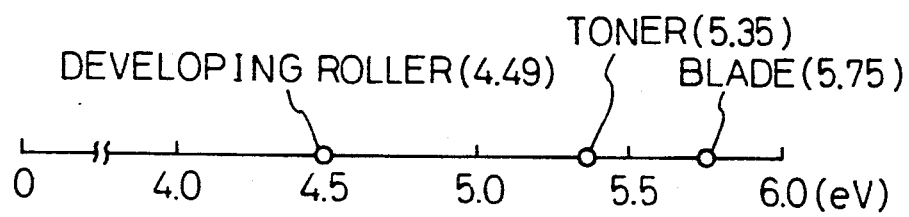
Figure 26:
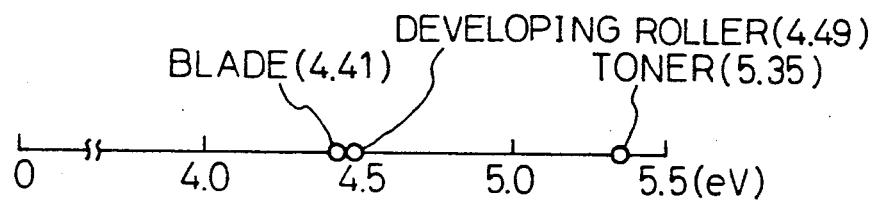
Figure 27:
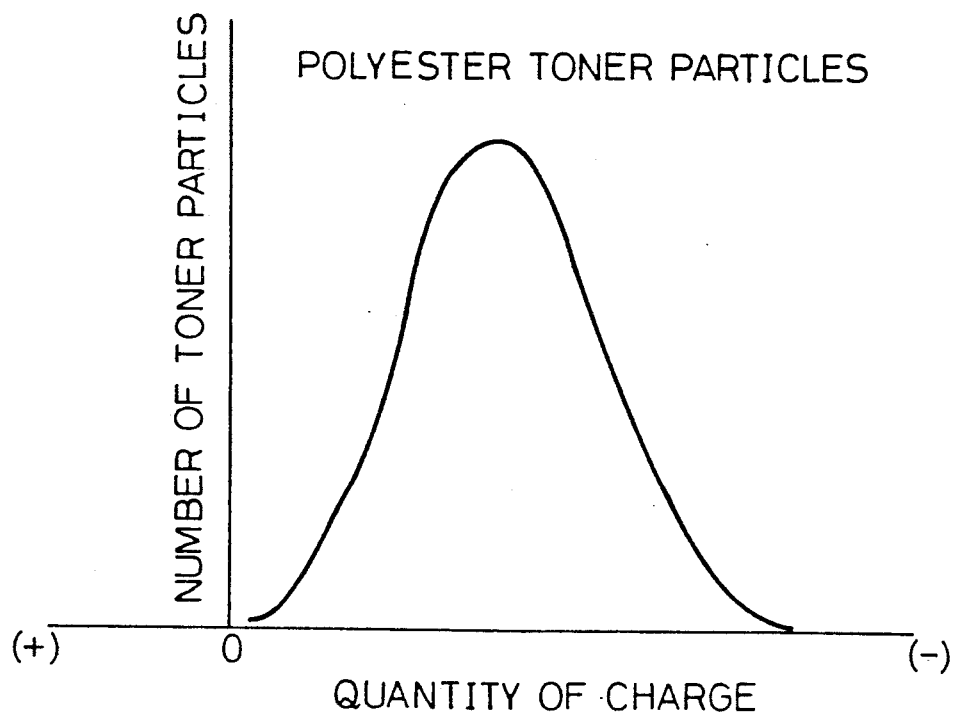
Figure 28:
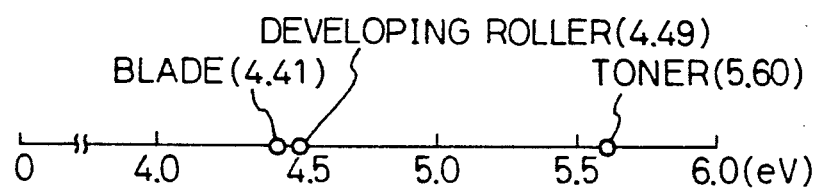
Figure 29A:
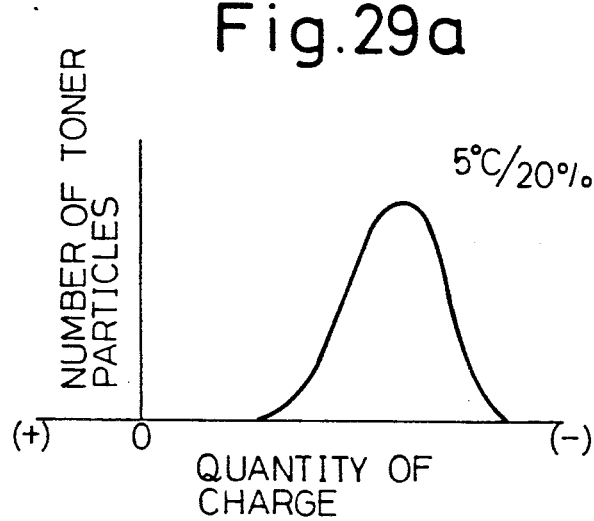
Figure 29B:
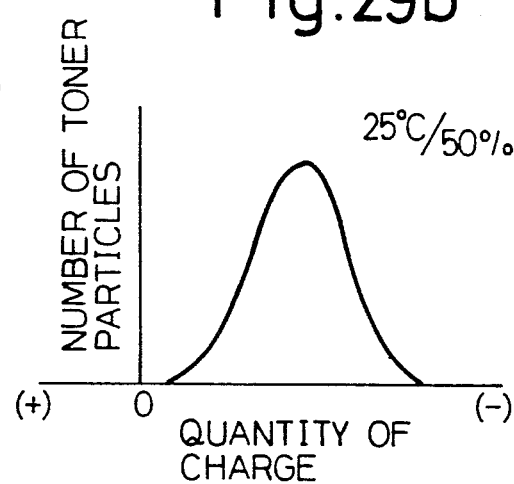
Figure 29C:
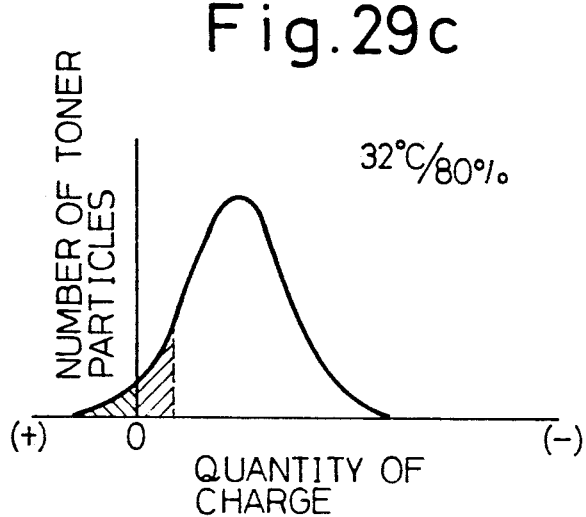
Figure 30:
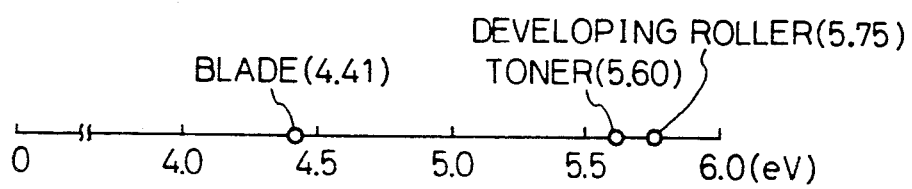
Figure 31A:
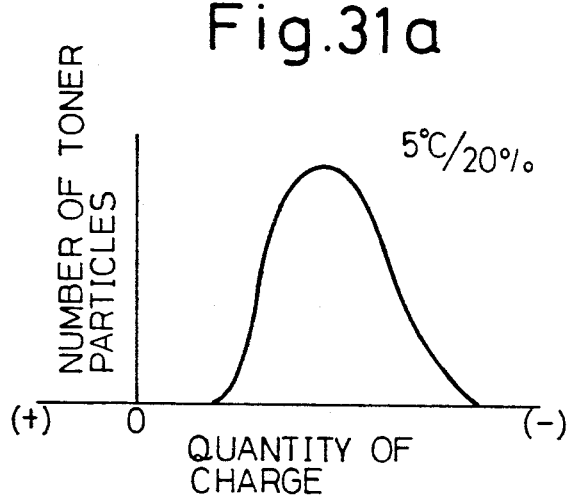
Figure 31B:
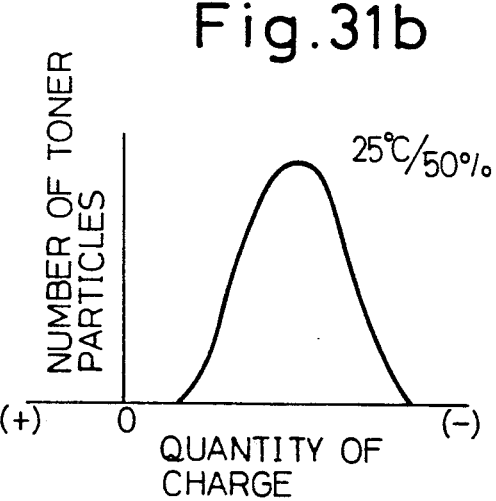
Figure 31C:
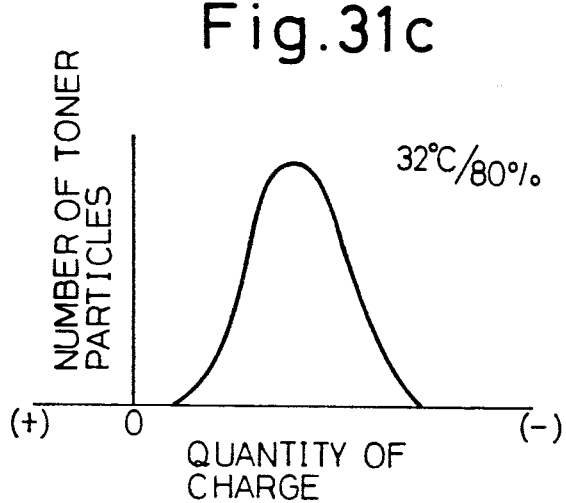
Figure 32:
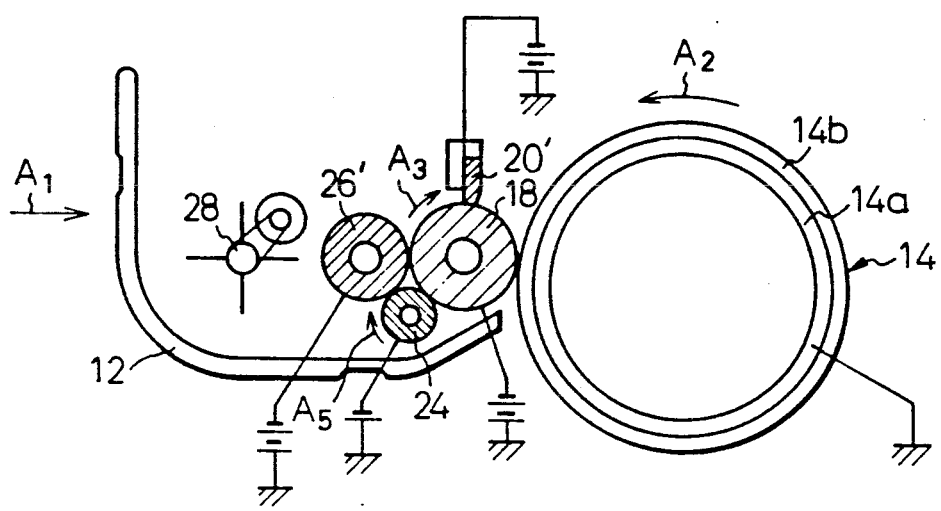
Figure 33:
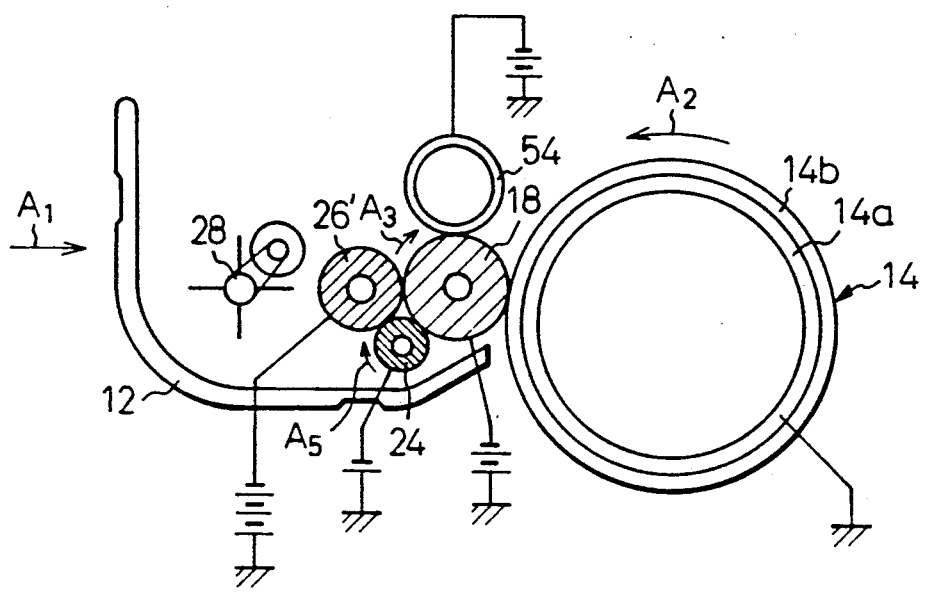
Figure 34:
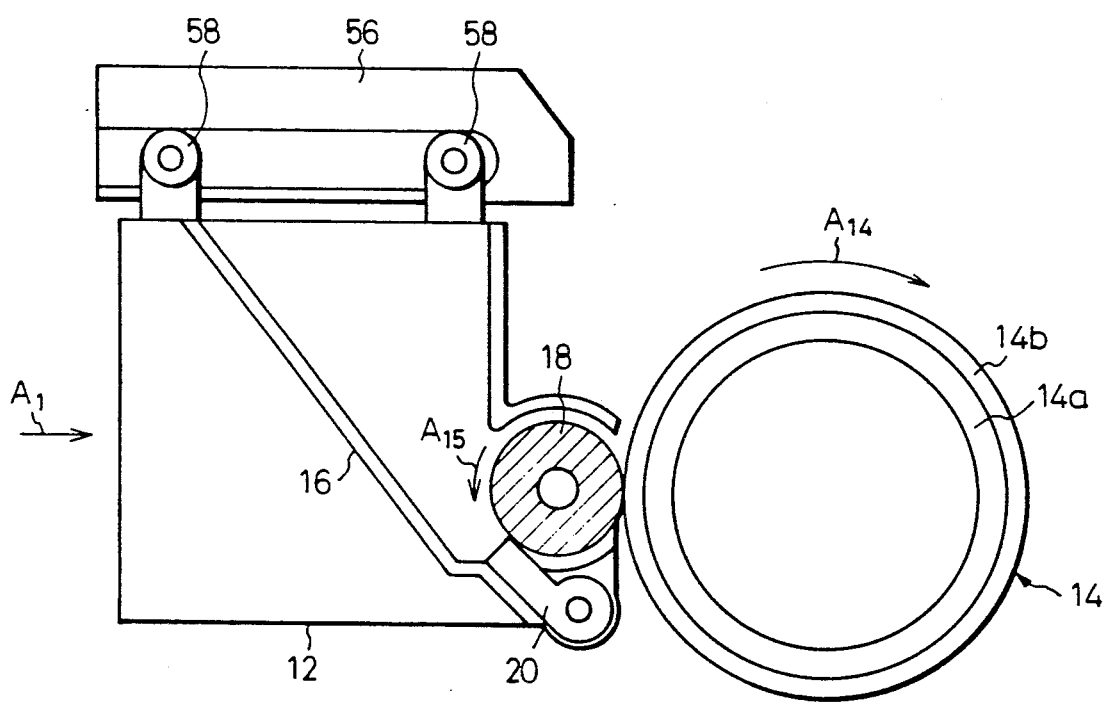

FIGS. 6(a), 6(b), and 6(c) are schematic views each showing a contact area between a prior conductive solid rubber developing roller and a blade member resiliently pressed thereagainst;

FIG. 7(a) is a schematic sectional view showing a toner particle pressed into a surface of the prior solid rubber developing roller, and FIG. 7(b) a schematic plan view of FIG. 7(a);

FIG. 8(a) is a schematic plan view showing a toner particle captured by a pore opening existing in the surface of the conductive open-cell foam rubber developing roller of the present invention, and FIG. 8(b) is a schematic sectional view of FIG. 8(a);

FIG. 9 is a schematic view showing a contact area between the conductive open-cell foam rubber developing roller and a blade member resiliently pressed thereagainst;

FIG. 10 is a schematic sectional view showing an extruder for extruding a heat-fused conductive foam resin material into a circular cross sectional product used to produce the conductive open-cell foam rubber developing roller;

FIG. 11 is a partially enlarged schematic sectional view showing a solid skin layer with which the extruded product of FIG. 10 is covered;

FIG. 12 is a schematic perspective view showing a solid skin removing machine for removing the solid skin layer from the extruded product;

FIG. 13 is a graph showing a relationship between a linear pressure at which the conductive open-cell foam rubber developing roller is pressed against the photosensitive drum and a maximum number of sheets which can be printed by the photosensitive drum;

FIG. 14 is a graph showing a relationship between an optical density (O.D.) of a developed image and a contact or nip width between the conductive open-cell foam rubber developing roller and the photosensitive drum;

FIG. 15 is a graph showing a relationship between a hardness of the conductive open-cell foam rubber developing roller and a nip width between the porous rubber developing roller and the photosensitive drum;

FIG. 16 is a graph showing a relationship between a hardness of the conductive open-cell foam rubber developing roller and a percentage of uneven development;

FIG. 17 is a graph showing a relationship between a hardness of the conductive open-cell foam rubber developing roller and a difference between the highest and lowest optical densities when printing a sheet solidly with a black developer;

FIG. 18 is a graph showing a relationship between a variation of the temperature and air moisture content and an optical density (O.D.) of an electrophotographic fog appearing when using each of the conductive open-cell foam rubber developing roller having an Asker hardness of 20° and the solid rubber developing roller having an Asker hardness of 58°;

FIG. 19 is a graph showing a charge distribution of polyester resin-based toner particles when being charged by using a conductive open-cell foam polyurethane rubber developing roller;

FIG. 20 is a graph showing a charge distribution of styrene acrylic resin-based toner particles when being charged by using the conductive open-cell foam polyurethane rubber developing roller;

FIG. 21 is a graph showing a charge distribution of the polyester resin-based toner particles when being charged by using a conductive open-cell foam silicone rubber developing roller;

FIG. 22 is a graph showing a charge distribution of the styrene acrylic resin-based toner particles when being charged by using the conductive open-cell foam silicone rubber developing roller;

FIG. 23 is a graph showing how a resolving power of a developed image varies as a number of printed sheets is increased when using the conductive open-cell foam polyurethane rubber developing roller and the conductive open-cell foam silicone rubber developing roller;

FIG. 24 is a graph showing a charge distribution of the polyester resin-based toner particles when being charged by a triboelectrifcation while using the conductive open-cell foam polyurethane rubber developing roller and a Teflon-coated rubber blade member;

FIG. 25 is a work function scale for comparing the work functions of the conductive open-cell foam polyurethane rubber developing roller, the Teflon-coated rubber blade member, and the polyester resin-based toner particles;

FIG. 26 is a work function scale for comparing the work functions of the conductive open-cell foam polyurethane rubber developing roller, an aluminum blade member, and the polyester resin-based toner particles;

FIG. 27 is a graph showing a charge distribution of the polyester resin-based toner particles when charged by a triboelectrifcation while using the conductive open-cell foam polyurethane rubber developing roller and the aluminum blade member;

FIG. 28 is a work function scale for comparing the work functions of the conductive open-cell foam polyurethane rubber developing roller, the aluminum blade member, and another type of polyester resin-based toner particles;

FIGS. 29(a), 29(b), and 29(c) are graphs showing a charge distribution of the polyester resin-based toner particles referred to in FIG. 28 when charged by a triboelectrification while using the conductive open-cell foam polyurethane rubber developing roller;

FIG. 30 is a work function scale for comparing the work functions of a Teflon-coated conductive open-cell foam polyurethane rubber developing roller, the aluminum blade member, and the polyester resin-based toner particles referred to in FIG. 28;

FIGS. 31(a), 31(b), and 31(c) are graphs showing a charge distribution of the polyester resin-based based toner particles referred to in FIG. 28 when charged by a triboelectrification while using the aluminum blade member;

FIG. 32 is a schematic view showing another embodiment of a developing device according to the present invention;

FIG. 33 is a schematic view showing a modification of the embodiment shown in FIG. 32;

FIG. 34 is a schematic view showing a further embodiment of a developing device according to the present invention; and FIG. 35 is a schematic view showing an electrophotographic color printer including three developing devices according to the present invention, using yellow color, magenta color, and cyan color non-magnetic type one-component developers, respectively.

DETAILED DESCRIPTION OF THE PREFERRED EMBODIMENTS

Figure 1:
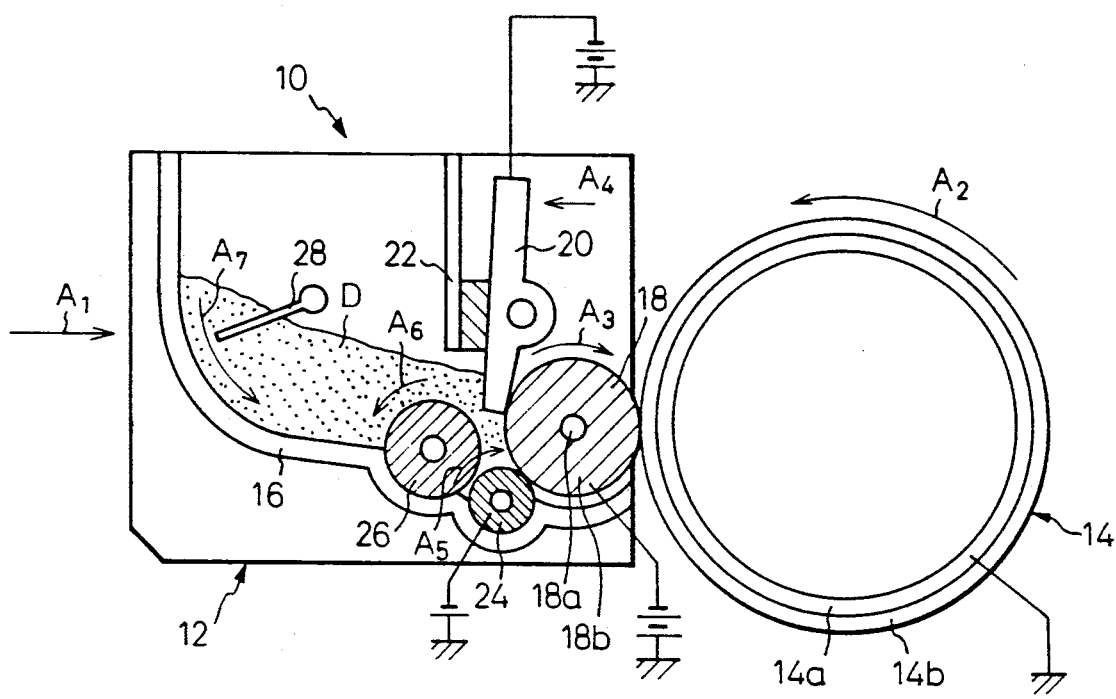
FIG. 1 is a schematic view showing an embodiment of a developing device according to the present invention.

FIG. 1 schematically shows a developing device 10 using a non-magnetic type one-component developer which is intended to be incorporated into an electrophotographic printer (not shown). The developing device 10 comprises a casing 12 supported by a frame structure of an electrophotographic printing machine (not shown) in such a manner that the casing 12 is movable toward and away from a photosensitive drum 14 forming a part of the electrophotographic printer. The photosensitive drum 14 comprises a sleeve substrate 14a made of a conductive material such as aluminum, and a photoconductive material film 14b formed therearound. The photoconductive material film 14b of the photosensitive drum 14 may be composed of an organic photoconductor (OPC), a selenium photoconductor or the like. A uniform distribution of electrical charges is produced on a surface of the photoconductive material film 14b of the photosensitive drum 14 by a suitable discharger (not shown), such as a corona discharger, and an electrostatic latent image is then optically written on the charged surface of the photoconductive material film 14b by an optical writing means (not shown) such as a laser beam scanner, an LED (light emitting diode) array, a liquid crystal shutter array or the like. In particular, when the charged area of the photoconductive material film 14b is illuminated by the optical writing means, the charges are released from the illuminated zone through the grounded sleeve substrate 14a, so that a potential difference between the illuminated zone and the remaining zone forms the electrostatic latent image. The casing 12 includes a vessel 16 for holding a non-magnetic type one-component developer D composed of colored fine toner particles of a suitable synthetic resin such as polyester or styrene acrylic resin, and having an average diameter of about 10 μm.

The developing device 10 also comprises a conductive open-cell foam rubber roller 18 rotatably provided within the vessel 16 as a developing roller, a portion of which is exposed therefrom. The casing 12 is resiliently biased in a direction indicated by an arrow $A_1$, by a suitable resilient element (not shown) such as a coil or leaf spring, so that the exposed portion of the developing roller 18 is resiliently pressed against the surface of the photosensitive drum 14. During the operation of the developing device, the photosensitive drum 14 and the developing roller 18 are rotated in the directions indicated by arrows $A_2$ and $A_3$, and the conductive open-cell foam developing roller 18 entrains the toner particles to form a developer layer therearound, whereby the toner particles are brought to the surface of the photosensitive drum 14 for the development of the latent image formed thereon. For example, the photosensitive drum 14 may have a diameter of 60 mm and a peripheral speed of 70 mm/s. Further, the developing roller 18 may have a diameter of 20 mm and a peripheral speed of from 1 to 4 times that of the photosensitive drum 14. The developing roller 18 comprises a shaft 18a rotatably supported by the walls of the vessel 16, and a roller element 18b mounted thereon and formed of the conductive open-cell foam rubber material such as a conductive open-cell foam polyurethane rubber material, a conductive open-cell foam silicone rubber material, or a conductive open-cell foam acrylonitrile-butadiene rubber material.

According to the present invention, the developing roller 18 is constituted in such a manner that pore openings in the conductive open-cell foam rubber roller element 18b have a diameter which is within a given range, to ensure that the development process is properly carried out, as mentioned hereinafter in detail. Note, the developing roller 18 may contribute to the electrical charging of the toner particles by a triboelectrification therebetween. The roller element 18b preferably has a volume resistivity of about $10^4$ to $10^{10}$ Ω·m, most preferably $10^6$ Ω·m, and an Asker-C hardness of about 10° to 50°, most preferably 10°. The developing roller 18 is pressed against the photosensitive drum 14 at a linear pressure of about 22 to 50 g/cm, most preferably 43 g/cm, so that a contact or nip width of about 1 to 3.5 mm can be obtained between the developing roller 18 and the photosensitive drum 14.

The developing device 10 further comprises a blade member 20 engaged with the surface of the developing roller 18 to uniformalize a thickness of the developer layer formed therearound, whereby an even development of the latent image is ensured. The blade member 20 is pivotably attached to a support element 22 suspended from the casing 12, and is resiliently biased in a direction indicated by an arrow $A_4$ so that the blade member 20 is resiliently pressed against the developing roller 18 at a linear pressure of about 26 g/mm, to regulate the thickness of the developer layer formed therearound. The blade member 20 may be formed of a suitable non-conductive or conductive rubber material, but preferably is coated with Teflon, and may be further formed of a suitable metal material such as aluminum, stainless steel, brass or the like. The blade member 20 may also serve to electrically charge the toner particles by a triboelectrification therebetween.

The developing device 10 further comprises a toner-removing roller 24 rotatably provided within the vessel 16 and in contact with the developing roller 18 in such a manner that a contact or nip width of about 1 mm is obtained therebetween, and by which remaining toner particles not used for the development of the latent image are removed from the developing roller 18. The toner-removing roller 24 is formed of a conductive open-cell foam rubber material, preferably a conductive open-cell foam polyurethane rubber material having a volume resistivity of about $10^6$ Ω·m, and an Asker-C hardness of about 10° to 70°°, most preferably 30°. The toner-removing roller 24 is rotated in the same direction as the developing roller 18, as indicated by an arrow $A_5$, whereby the remaining toner particles are removed from the developing roller 18. For example, the toner-removing roller 24 may have a diameter of 11 mm and a peripheral speed of from 0.5 to 2 times that of the developing roller 18. In the embodiment shown in FIG. 1, the toner-removing roller 24 is partially received in a recess formed in a bottom portion of the vessel 16, whereby a leakage of the toner particles from a space between the developing roller 18 and the vessel bottom can be prevented.

Further, the developing device 10 comprises a paddle roller 26 for moving the toner particles toward the developing roller 18, and an agitator 28 for agitating the developer D to eliminate a dead stock thereof from the vessel 16. The paddle roller 18 and the agitator 28 are rotated in the directions indicated by arrows $A_6$ and $A_7$.

In operation, for example, when the photosensitive film 14b of the photosensitive drum 14 is formed of an organic photoconductor (OPC), a distribution of a negative charge is produced thereon, a charged area of which may have a potential of about −600 to −650 volts. In this case, the latent image zone formed on the drum 14 by the optical writing means may have a reduced potential of about −50 volts. On the other hand, the toner particles are given a negative charge. When the porous rubber developing roller 18 is rotated within the developer D, the toner particles are captured in the pore openings in the surface of the roller element 18b, so that the toner particles are carried to the surface of the photosensitive drum 14.

A developing bias voltage of about −200 to −500 volts is applied to the developing roller 18 so that the toner particles carried to the surface of the drum 14 are electrostatically attracted only to the latent image zone having the potential of about −50 volts, whereby the toner development of the latent image is carried out. As mentioned above, the remaining toner particles not used for the development are mechanically removed from the developing roller 18 by the toner-removing roller 24, but the remaining toner particles also can be electrostatically removed from the developing roller 18 by applying a bias voltage of −150 to −400 volts to the toner-removing roller 24. Since the developer layer formed of the remaining toner particles is subjected to physical and electrical effects during the developing process, it should be removed from the developing roller 18 and then a fresh developer layer formed thereon. On the other hand, when the blade member is formed of the conductive material, a bias voltage of about −200 to −500 volts is applied to the conductive blade member 20 so that the charged toner particles are prevented from being electrostatically adhered to the blade member 20. This is because, when the blade member has an opposite polarity with respect to a potential of the developing bias voltage applied to the developing roller, the toner particles are electrostatically adhered to the blade member 20, to thereby hinder an even formation of the developer layer around the developing roller 18. The application of the bias voltage to the blade member 20 may also contribute to the charging of the toner particles by a charge-injection effect.

Note, when the photoconductive material film 14b of the photosensitive drum 14 is composed of a selenium photoconductor, on which a distribution of a positive charge is produced, the toner particles are positively charged and a positive bias voltage is applied to the developing roller 18 and the blade member 20.

Figure 2:
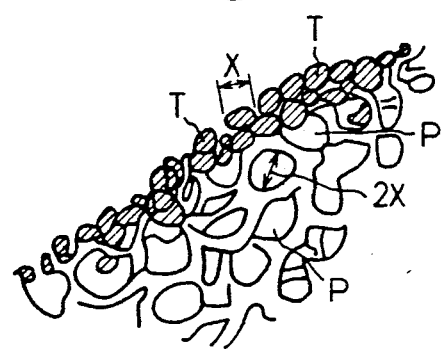
FIG. 2 is a partially enlarged schematic sectional view showing a conductive open-cell foam rubber developing roller incorporated into the developing device of FIG. 1.

According to the present invention, as shown in FIG. 2, the pore openings P of the porous rubber roller element 18b of the developing roller 18 preferably have a diameter which is at most twice the average diameter X of the toner particles T, whereby a penetration of the toner particles P into the porous rubber roller element 18b can be prevented. Namely, a softness of the roller element 18b can be maintained since it is not hardened by the penetration of the toner particles therein, whereby a long operating life of the developing roller can be ensured and a proper development process can be maintained, as easily understood from the following descriptions with reference to FIGS. 3 and 4.

Figure 3:
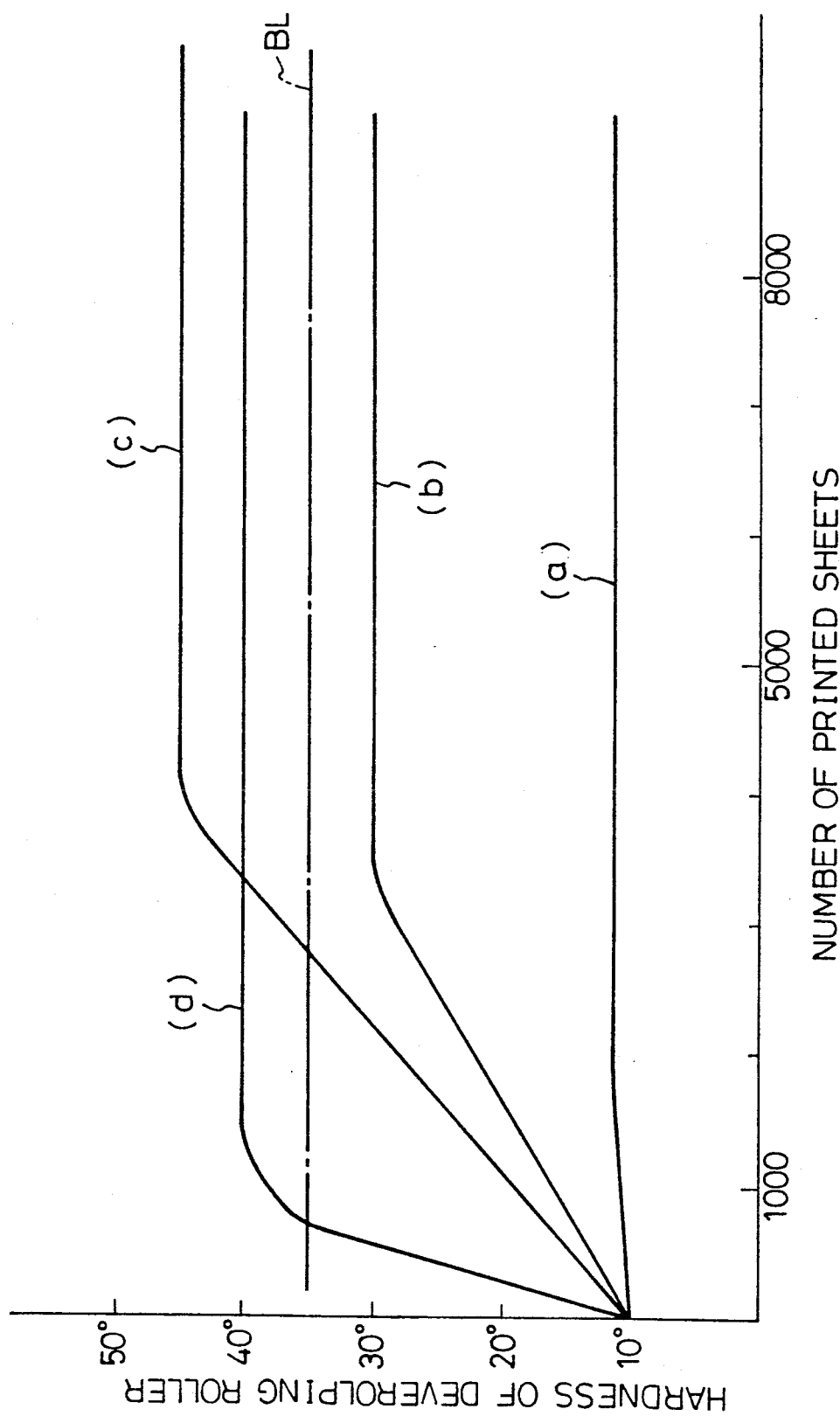
FIG. 3 is a graph showing how a hardness of each of conductive open-cell foam rubber developing rollers having pore opening diameters of 10, 20, 50, and 100 μm varies as a number of printed sheets is increased.
Figure 4:
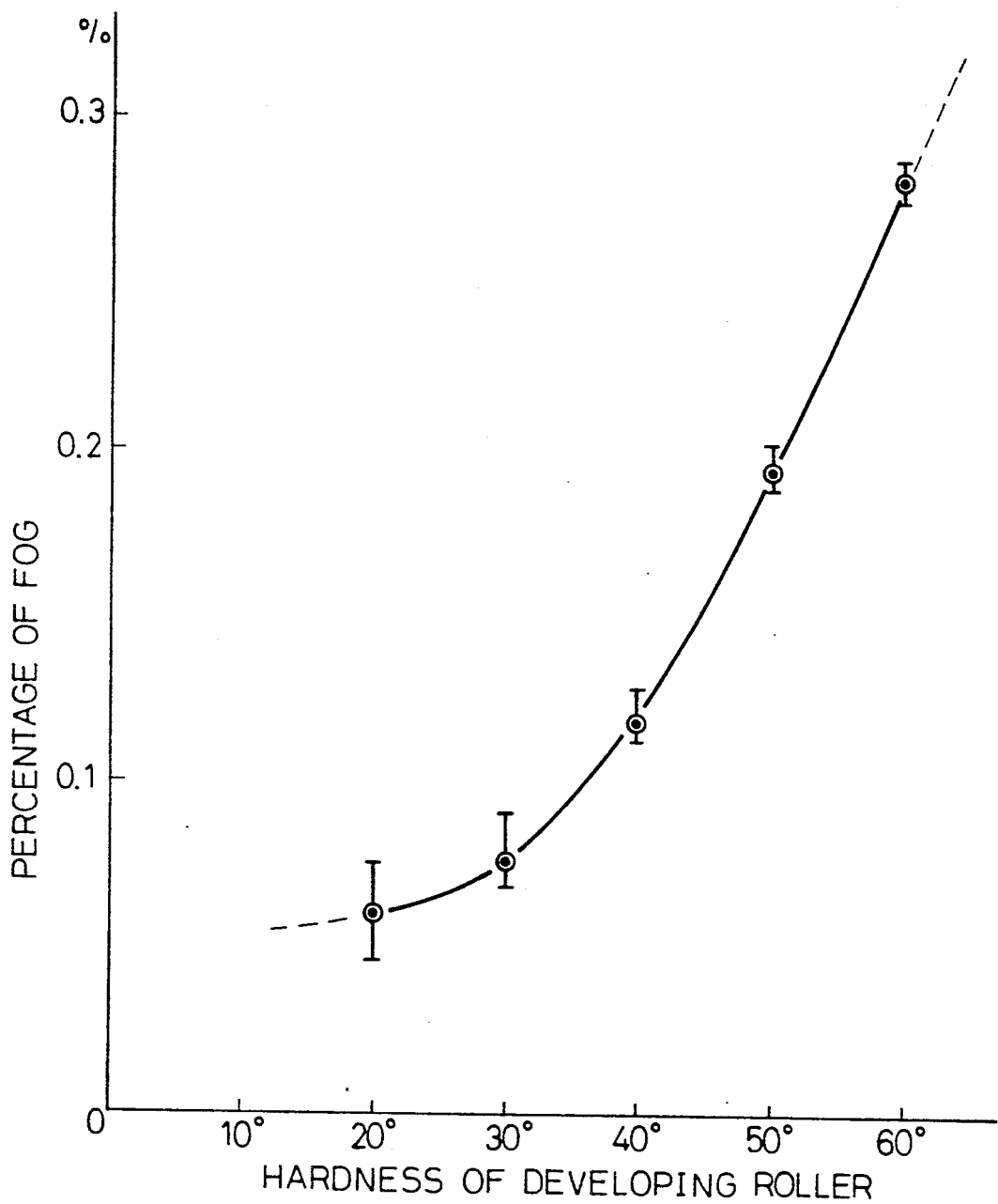
FIG. 4 is a graph showing how a percentage of electrophotographic fog which may appear during the development process varies as the hardness of the conductive open-cell foam rubber developing roller is raised.

FIG. 3 shows how a hardness of developing rollers having pore opening diameters of 10, 20, 50, and 100 μm varies as a number of printed sheets is increased, and FIG. 4 shows how a percentage of electrophotographic fog which may be appear during the development process varies as a hardness of the developing roller is raised. Note, when the hardness of the developing roller becomes large due to the penetration of the toner particles therein, a force by which the toner particles are held at the surface of the developing roller is weakened, and thus some of the toner particles can be adhered to the surface zone of the photosensitive drum other than the latent image zone thereof, thereby causing the electrophotographic fog during the development. In FIG. 3, (a), (b), (c), and (d) denote developing rollers having pore opening diameters of 10, 20, 50, and 100 μm, respectively. Note, in tests carried out to obtain the results shown in FIGS. 3 and 4, toner articles having an average diameter of 10 μm were used. As apparent from FIG. 3, an initial hardness of the developing roller having a pore opening diameter of 10 μm is maintained even after the number of printed sheets has exceeded 8,000, which shows that there is very little penetration of the toner particles into the pore openings of the porous rubber developing roller. The hardness of the developing rollers having the pore opening diameters of 20, 50, and 100 μm is gradually increased until the number of printed sheets reaches about 3,500, 4,000, and 1,500, respectively, and then constantly maintained. This, of course, means that each of these developing rollers has been hardened by the penetration of the toner particles into the pore openings thereof. As apparent from FIG. 4, the larger the hardness of the developing roller, the greater the increase in the percentage of electrophotographic fog. For example, if an electrophotographic fog of 0.1% is permissible, the hardness of the developing roller may be increased to an Asker C-hardness of about 35° by the penetration of the toner particles into the pore openings thereof. Accordingly, a developing roller having pore opening diameters of at most 20 μm, the hardness of which does not exceed a border line BL of 35° shown in FIG. 3, is most preferable.

Figure 5:
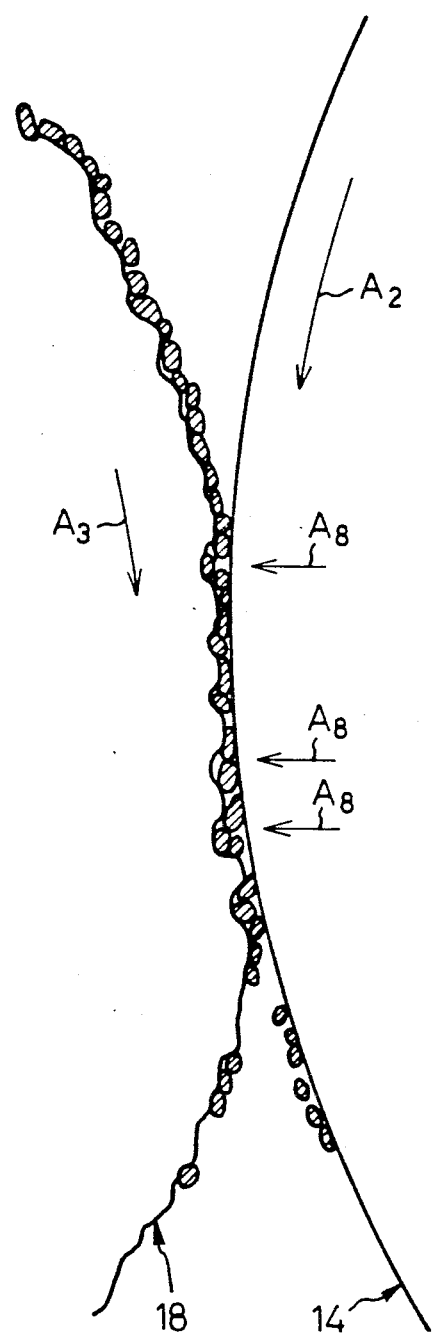
FIG. 5 is a partially enlarged schematic sectional view showing a developing or contact area between a photosensitive drum and the conductive open-cell foam rubber developing roller resiliently pressed thereagainst.

When the pore opening diameter of the developing roller is more than twice the average diameter of the toner particles, or when the pore diameter of the developing roller is more than 20 μm, this brings the disadvantage of an uneven development of the latent image. In particular, as shown in FIG. 5, the electric field produced by applying the bias voltage to the developing roller 18 is weakened at locations (indicated by arrows $A_8$) at which the pore openings have a diameter of more than 20 μm, because of the larger space formed between the developing roller 18 and the photosensitive drum 14, and thus an amount of the toner particles moved from the pore openings having a diameter of more than 20 μm toward the latent image zone of the drum 14 is reduced, whereby an uneven development of the latent image occurs.

Nevertheless, the pore opening diameter of the developing roller may be more than twice the average diameter of the toner particles as long as the penetration of the toner particles into the developing roller can be effectively prevented. In particular, the pore openings or porous cells of the developing roller are in communication with each other through fine passages formed among the porous cells. Accordingly, even though the pore opening diameter of the developing roller is more than twice the average diameter of the toner particles, by giving a diameter less than twice the toner particle average diameter to the fine passages communicating the porous cells with each other, it is possible to prevent the penetration of the toner particles into the developing roller.

When the diameter of the pore openings of the developing roller is less than one-fourth of the average diameter of the toner particles, it is impossible for the pore openings to capture the toner particles, and thus a sufficient amount of the toner particles cannot be entrained by the developing roller, whereby an underdevelopment occurs. Accordingly, in the developing roller, the diameter of the pore openings must be within from one-fourth to twice the average diameter of the toner particles.

Referring to FIGS. 6(a), 6(b) and 6(c), a conventional solid rubber developing roller as disclosed in the above-mentioned Japanese Publication No. 60-6846 is designated by "R", a blade member for regulating a thickness of a developer layer formed therearound by "B", and toner particles by "T". Also, in these drawings, a rotational direction of the solid rubber roller R is indicated by an arrow $A_9$. As stated hereinbefore, this type solid rubber roller R has the rough surface by which the toner particles can be sufficiently entrained although the coefficient of friction of the solid rubber roller R is lowered due to variations in the environment, in particular, a drop in the temperature and air moisture content.

Note, when a coefficient of friction of the toner particles T is relatively low, the thickness of the developer layer formed around the solid rubber roller R can be easily regulated by the blade member B, as shown in FIG. 6(a), because a substantial part of the toner particles T entrained by the solid rubber roller R can pass through a gap between the solid rubber roller R and the blade member B due to the low friction coefficient of the toner particles. If the coefficient of friction of the toner particles is raised by a raise in the temperature and air moisture content, the toner particles cannot pass through the gap between the solid rubber roller R and the blade member B so as to be eliminated from the solid rubber roller R by the blade member B. In particular, although the toner particle T has been just introduced into the gap between the solid rubber roller R and the blade member B, as shown in FIG. 6(b), it cannot enter therein because of the frictional force between the toner particle T and the blade member B, as shown in FIG. 6(c), so that the toner particle T is pressed into the surface of the solid rubber roller R, as indicated by an arrow $A_{10}$ in FIG. 7(a). As a result, the surface of the solid rubber roller B is stretched at the location into which the toner particle is pressed, as indicated by arrows $A_{11}$ in FIG. 7(a). Namely, the toner particle T is subjected to a resilient force from the stretched portion of the solid rubber roller surface, as indicated by arrows $A_{12}$ in FIG. 7(b), so that the toner particle T is forced out of the solid rubber roller surface.

Conversely, according to the present invention, the pore openings are formed over the developing roller surface in the form of a network, and the toner particles pressed into the pore openings are resiliently held and captured by each pore opening, as shown in FIGS. 8(a) and 8(b). In these drawings, the network structure of the developing roller is designated by "N", the toner particle resiliently captured by the pore opening of the network structure by "T", and the resilient force exerted on the toner particles by the network structure is indicated by arrows A. Accordingly, although the friction coefficient of the toner particles "T" is raised, the toner particles "T" cannot be removed from the surface of the developing roller 18 by the blade member 20, as shown in FIG. 9, because they are firmly captured by the pore openings of the developing roller 18.

The developing roller 18 may be produced by an extruder 30, as shown in FIG. 10, which includes a cylindrical hopper 30a, a plunger 30b slidably received therein, and a die 30c attached to an output port of the cylindrical port 30a. A suitable sythetic resin material, e.g., polyurethane, silicone, acrylonitrile-butadiene or the like, containing a conductive substance such as carbon or a fine metal powder, is fused by heating and is foamed by adding a suitable foaming agent thereto. The fused and foamed material is introduced into the hopper 30a, and the plunger 30b is actuated so that a conductive circular sectional product 32 is extruded through the die 30c. The extruded product 32 is then cut into roller sections having a given length, but these roller sections cannot be directly used as the developing roller 18, because an inside porous structure 32a of the cut roller section is covered by a solid skin layer 32b, as shown FIG. 11. Accordingly, the solid skin layer 32b must be removed from the roller section, so that the pore openings are exposed in the surface of the roller section, before it can be used as the developing roller 18. For example, the solid skin layer 32b may be removed from the roller section as shown in FIG. 12. In particular, the roller section is mounted on a shaft 34 having one end held by a chuck element 36 and the other end supported by a centering pin element 38. As shown in FIG. 12, the chuck element 36 is driven by an electric motor 40 through a drive belt 42, so that the roller section is rotated in a direction as indicated by an arrow $A_{13}$, while an abrasive stone 44 is pressed against the surface of the roller section and is moved along a longitudinal axis thereof, whereby the solid skin layer 32b is removed from the roller section until the pore openings are exposed at the surface thereof, and thus the developing roller as mentioned above is obtained. Note, the solid skin layer 32b may be removed from the extruded product 32, if necessary, and thereafter the product 32 from which the solid skin layer 32b has been removed is cut into roller sections. Also note, by regulating the amount of foaming agent added to the start resin material, it is possible to give a finished developing roller pore openings having a given diameter, and by regulating the amount of a conductive substance added to the start resin material, it is possible to obtain a finished developing roller having a given volume resistivity.

According to another aspect of the present invention, the developing device 10 is characterized in that the developing roller 18 as mentioned above has an Asker C-hardness of at most 50°, preferably 35°. The harder the developing roller 18, the greater the wear of the photosensitive film 14b of the drum 14, whereby the operating life of the drum 14 is shortened. As shown in FIG. 13, the higher the linear pressure at which the developing roller is pressed against the photosensitive drum, the lower the number of sheets which can be printed by the photosensitive drum. For example, when the photosensitive drum is required to withstand a printing of more than 15,000 sheets, the developing roller must be pressed against the drum at a linear pressure of at most 50 g/cm. On the other hand, as shown in FIG. 14, the larger a contact or nip width between the developing roller and the drum, the higher an optical density (O.D.) of the developed image. For example, when the developing roller is pressed against the drum at a linear pressure of 40 g/cm, the nip width therebetween must be at least 1 mm before an optical density of more than about 0.9 necessary for the development process can be obtained. Note, a nip width of more than 1.5 mm is preferable for obtaining a developed image with a required optical density. Also, as shown in FIG. 15, the lower the hardness of the developing roller, the larger the nip width between the developing roller and the drum. For example, when a developing roller having an Asker C-hardness of 50° is pressed against the drum at a linear pressure 50 g/cm, the nip width therebetween is 1 mm, whereas when a developing roller having an Asker C-hardness of 40° is pressed against the drum at the same linear pressure, the nip width therebetween is 1.1 mm. Accordingly, the Asker C-hardness of the developing roller should be at most 50°, to enable the photosensitive drum to print more than 15,000 sheets. Note, preferably a developing roller having an Asker C-hardness of less than 35° is pressed against the drum in such a manner that the nip width therebetween is from 1 to 3.5 mm.

When the blade member 20 is made of a metal material such as aluminim, stainless steel, brass or the like, the developing roller 18 must have an Asker C-hardness of at most 50°. The metal blade member has a treated and finished surface which is engaged with the developing roller to regulate the thickness of the developer layer formed therearound. In general, a possible accuracy of the finished surface of the metal blade member is on the order of about 30 μm, but this may be rough relative to toner particles having an average diameter of 10 μm, so that the regulated thickness of the developer layer is made uneven due to the rough surface of the metal blade member, to thereby cause an uneven development of the latent image. The greater the hardness of the developing roller, the greater the variation of the developer thickness, and thus the uneven development becomes more noticeable as shown in FIG. 16. In this drawing, the abscissa shows a hardness of the developing roller, and the ordinate shows a percentage of uneven development when a sheet is printed solidly with a black developer. For example, if an uneven development of at most 0.5%, which is not visually noticeable, is permissible, as indicated by a broken line in FIG. 16, the developing roller must have an Asker C-hardness of at most 50°. Also, FIG. 17 shows a relationship between a hardness of the developing roller and a difference (ΔO.D.) between the highest and lowest optical densities when printing a sheet solidly with a black developer. Similarly, the difference of 0.2 (ΔO.D.), which is not visiually noticable, corresponds to the Asker C-hardness of about 50°, as indicated by broken lines in FIG. 17.

In general, a hardness of the synthetic rubber material such as a polyurethane rubber material, upon which the porous rubber developing roller 18 according to the present invention and the conventional solid rubber developing roller as mentioned above may be based, is made greater by a drop in temperature and air moisture content. Also, a coefficient of friction of the synthetic rubber material such as a polyurethane rubber material is lowered by a drop in temperature and air moisture content, as mentioned above. As a result, when using a conventional solid rubber developing roller, a toner density for the development is lowered because the toner particles cannot be sufficiently entrained by the solid roler, and an electrophotographic fog appears because the toner particles cannot be firmly held by the solid rubber developing roller. On the contrary, regardless of variations of temperature and air moisture content, the hardness of the developing roller according to the present invention cannot be greatly lowered because of the porous structure thereof, and the toner particles are easily captured and firmly held by the pore openings of the porous rubber developing roller. Thus, according to the present invention, the electrophotographic fog can be substantially eliminated even though the temperature and air moisture content are varied. FIG. 18 shows a relationship between a variation of temperature and air moisture content and an optical density (O.D.) of an electrophotographic fog when using a porous rubber developing roller having an Asker hardness of 20° and a solid rubber developing roller having an Asker hardness of 58°. Note, in FIG. 18, open circles and solid circles correspond to the porous rubber developing roller having an Asker hardness of 20° and the solid rubber developing roller having an Asker hardness of 58°, respectively. As apparent from FIG. 18, when the porous rubber developing roller having an Asker hardness of 20° was used, the electrophotographic fog was substantially eliminated even though the temperature and air moisture content had dropped, whereas when the solid rubber developing roller having an Asker hardness of 58° was used, an optical density of the electrophotographic fog was gradually increased when the temperature and air moisture content fell below 25° C. and 50%, respectively.

According to a further aspect of the present invention, the developing device 10 is characterized in that the developing roller 18 is formed of the conductive open-cell foam polyurethane rubber material. When the triboelectrification between the developing roller 18 and the toner particles is utilized for charging the toner particles, the developing roller 18 is preferably formed of the conductive open-cell foam polyurethane rubber material, not the conductive open-cell foam silicone rubber material, because the toner particles charged by using the polyuretane foam rubber developing roller can be given a charge distribution that ensures a proper development of a latent image.

For example, when the photosensitive drum 14 is formed of the organic photoconductor (OPC), the polyester or styrene acrylic resin-based developer is used so that the toner particles thereof are given a negative charge. FIG. 19 shows a charge distribution of the polyester resin-based toner particles when charged while using the polyurethane foam rubber developing roller, and FIG. 20 shows a charge distribution of the styrene acrylic resin-based toner particles when charged while using the polyurethane foam rubber developing roller. Further, FIG. 21 shows a charge distribution of the polyester resin-based toner particles when charged while using the silicone foam rubber developing roller, and FIG. 20 shows a charge distribution of the styrene acrylic resin-based toner particles when charged while using the silicone foam rubber developing roller. Note, in each of FIGS. 19, 20, 21 and 22, the abscissa and the ordinate indicate a quantity of charge and a number of toner particles, respectively. As apparent from these drawings, when the polyurethane foam rubber developing roller is used, the polyester resin-based and styrene acrylic resin-based developers substantially do not contain toner particles having a positive charge, whereas when using the silicone foam rubber developing roller, the polyester resin-based and styrene acrylic resin-based developers contain not only a positively-charged part of the toner particles indicated by reference numeral 46, but also a low-level negatively-charged part of the toner particles indicated by reference numeral 48. This is assumed to be because that the polyurethane foam rubber developing roller is neutral with regard to frictional electrification, whereas the silicone foam rubber developing roller is positive-high with regard to frictional electrification. In particular, the silicone foam rubber developing roller may be overcharged because of the positively-high characteristics thereof with regard to frictional electrification, so that an electrical discharge between the silicone foam rubber developing roller and the blade member 20 may occur, whereby a part of the toner particle is subjected to a positive charge. Note, the charge distributions of the toner particles shown in FIGS. 21 and 22 cannot ensure a proper development of a latent image because the positively-charged toner particles and the low-level negatively-charged toner particles may adhere to the surface of the photosensitive drum, except for the latent image zones, and thus the developer is prematurely consumed. Also, although the positively-charged toner particles adhered to the photosensitive drum cannot be transferred to a sheet or paper, the low-level negatively-charged toner particles can be transferred from the photosensitive drum to the sheet or paper, thereby causing an electrophotographic fog to appear thereon. Accordingly, when the triboelectrification between the developing roller 18 and the toner particles is utilized for charging the toner particles, the roller element 18b is preferably formed of the conductive polyurethane foam rubber material.

Furthermore, when the developing roller 18 is formed of the conductive polyurethane foam rubber material, not the conductive silicone foam rubber material, another advantage of maintaining a resolution of a developed image, and therefore a printed image, at a high level and over a long period can be obtained. Variations of the resolusion were measured where the polyurethane foam rubber developing roller and the silicone foam rubber developing roller were incorporated into electrophotographic printers having a dot density of 300 dpi (dots per inch). In the measurement, a sample pattern including a plularity of dot lines spaced from each other by a line space corresponding to the dot line was repeatedly printed out on a sheet or paper, and then a reflection density DB (reflected light intensity) from the dot lines and a reflection density DW (reflected light intensity) from the line spaces were determined from the printed sample pattern. The resolusion was evaluated by a percentage R obtained from the following formula:

$$R = \frac{\sum_{i=1}^{n} DW_i/n}{\sum_{i=1}^{n} DB_i/n} \times 100(\%)$$

Wherein: "n" indicates a number of dot lines or line spaces. As apparent from this formula, the smaller the percentage R, the greater the resolusion. Note, when the percentage R exceeds 60%, the resolusion derived therefrom is practically unacceptable. The results of this measurement are shown in FIG. 23, and as shown in this drawing, when the polyurethane foam rubber developing roller is used, the percentage R is constantly maintained at 30% throughout a printing of more than 8,000 sheets, whereas when the silicone foam rubber developing roller is used, the percentage R is raised to the limit of 60% when the number of printed sheets reaches about 8,000. This is assumed to be because the polyurethane foam rubber developing roller has a superior wear resistance to the silicone foam rubber developing roller, whereby a surface characteristic of the silicone foam rubber developing roller is easily deteriorated by the frictional engagement with the photosensitive drum 14 and the blade member, in comparison with the polyurethane foam rubber developing roller.

According to a further aspect of the present invention, the developing device 10 is characterized in that the developing roller 18 and the blade member 20 are constituted in such a manner that the work functions thereof are smaller or larger than that of the developer. When the triboelectrification between the developing roller 18 and blade member 20 and the toner particles is utilized for charging the toner particles, these work functions should be smaller or larger than that of the developer, as this enables the charged toner particles thereof to be given a charge distribution by which a proper development of a latent image is obtained. Note, this aspect of the present invention can be applied to a developing device including a developing roller formed of a solid rubber material.

For example, when the polyester resin-based toner particles are charged by using the developing roller formed of the conductive polyurethane foam rubber material and the blade member formed of the Teflon-coated rubber material, the charged polyester resin-based toner particles are given a charge distribution as shown in FIG. 24, which is similar to the charge distribution of FIG. 21. Namely, the polyester resin-based developer charged by using the polyurethane foam rubber developing roller includes a positively-charged part of the toner particles indicated by reference numeral 50, and a low-level negatively-charged part of the toner particles indicated by reference numeral 52. This is assumed to be because a work function of the Teflon-coated rubber blade member is larger than that of the polyester resin-based toner particles, and thus even though the toner particles are negatively charged by the polyurethane foam rubber developing roller, the negative charge of the toner particles is weakened by the blade member having a work function smaller than that of the toner particles, whereby a part of the toner particles can be given a positive charge. In practice, measurements proved that the polyurethane foam rubber developing roller, the polyester resin-based toner particles, and the Teflon-coated rubber blade member have the work functions of 4.49, 5.35, and 5.75 eV, respectively, as shown in FIG. 25.

When the toner particles have the charge distribution as shown in FIG. 24, for the same reasons as mentioned above, the developer also may be prematurely consumed and a photographic fog may appear. Nevertheless, these disadvantages can be surmounted by forming the blade member 20 of a metal material having a relatively small work function. For example, when the blade member is formed of aluminum having a work function of 4.41 eV, the work functions of the polyurethane foam rubber developing roller and blade member are less than that of the polyester resin-based toner particles, as shown in FIG. 26, so that the polyester resin-based toner particles can be negatively charged by the polyurethane foam rubber developing roller and the blade member. As a result, the charged polyester resin-based toner particles are given a desired charge distribution, as shown in FIG. 27.

The polyester resin-based toner particles having a work function of 5.35 eV were produced from the following raw materials:

| | |
|---|---|
| (1) polyester resin: (acid values 45; melting point 145° C.) | 93 pbw (parts by weight) |
| (2) carbon: (Black Pearls L: Cabot Corp.) | 3 pbw |
| (3) polypropylene wax: (Biscol 550 P: Sanyo Kasei K. K.) | 1 pbw |
| (4) azo dye: | 2 pbw |

-continued (Aizen Spilon Black TRH:
Hodogaya Chemical Corp. Lrd.)

Note, the polyester resin was obtained by a condensation of terephthalic acid, trimellitic acid, and diol having the structural formula below:

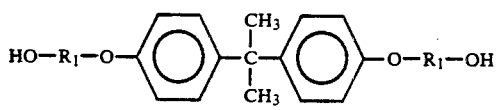

Wherein, $R_1$ is $C_nH_{2n}$ ($1 \leq n \leq 5$).

In the production steps, these raw materials were mixed, fused, kneaded, and then powdered to produce fine particles having a diameter of from 5 to 15 μm.

Also, when another type of azo dye (S34: Orient Chemical K.K.) was substituted for the azo dye (Aizen Spilon Black TRH: Hodogaya Chemical Corp. Lrd.), the polyester resin-based toner particles obtained had a work function of 5.60 eV, which is larger than the work functions of the polyurethane foam rubber developing roller and the aluminum blade member.

The styrene acrylic resin-based toner particles also can be used, as long as a work function thereof is larger than the work functions of the polyurethane foam rubber developing roller and the aluminum blade member. In practice, styrene acrylic resin-based toner particles having a work function of 5.25 eV, which is larger than the work functions of the polyurethane foam rubber developing roller and the aluminum blade member, were produced by using the following raw materials:

| | |
|---|---|
| (1) styrene acrylic resin: (melting point 140° C.) | 90 pbw |
| (2) carbon: (Black Pearls L: Cabot Corp.) | 5 pbw |
| (3) polypropylene wax: (Biscol 550 P: Sanyo Kasei K. K.) | 3 pbw |
| (4) azo dye: (Aizen Spilon Black TRH: Hodogaya Chemical Corp. Lrd.) | 2 pbw |

Note, the styrene acrylic resin was obtained by a copolymerization of styrene and n-butylacrylate.

In the production steps, these raw materials were mixed, fused, kneaded, and then powdered into fine particles having a diameter of from 5 to 15 μm.

Namely, when the toner particles are to be given a negative charge, the desired charge distribution can be obtained by constituting the developing roller and the blade member in such a manner that the work functions thereof are less than that of the toner particles.

On the other hand, when the toner particles are to be given the positive charge, the desired charge distribution can be obtained by constituting the developing roller and the blade member in such a manner that the work functions thereof are larger than that of the toner particles. For example, polyester resin-based toner particles having a work function of 5.35 eV or styrene acrylic resin-based toner particles having a work function of 5.25 eV can be given a positive charge by using the Teflon-coated rubber blade member having a work function of 5.75 eV and by coating the polyurethane foam rubber developing roller with Teflon to give a work function of 5.75 eV thereto. Note, the Teflon-coating of the developing roller should be carried out in such a manner that that the pore openings existing in the surface thereof are not covered over.

According to a further aspect of the present invention, the developing device 10 is characterized in that the developing roller 18 and the developer D are constituted in such a manner that the triboelectrification therebetween does not participate in the charging of the toner particles, as much as possible, because the triboelectrification therebetween is affected by variations in the enviroment, particularly, temperature and air moisture content changes, and thus although the work functions of the developing roller and the blade member are smaller or larger than that of the developer as mentioned above, the charged toner particles cannot be always given the desired charge distribution. Note, this aspect of the present invention also can be applied to a developing device including a developing roller formed of a solid rubber material.

For example, when using the aluminum blade member, the polyurethane foam rubber developing roller, and the polyester resin-based toner particles, having the work functions of 4.41, 4.49, and 5.60 eV as shown in FIG. 28, a charge distribution of the toner particles is easily changed by a variation of the temperature and air moisture content, as shown in FIGS. 29(a), 29(b), and 29(c). Namely, when the temperature and air moisture content are 5° C. and 20%, respectively, the toner particles are given a charge distribution as shown in FIG. 29(a), but when the temperature and air moisture content are raised from 5° C. and 20% to 25° C. and 50%, respectively, the charge distribution of the toner particles is shifted toward the positive side, as shown in FIG. 29(b), and when the temperature and air moisture content are raised to 32° C. and 80%, respectively, the charge distribution of the toner particles is further shifted toward the positive side, as shown in FIG. 29(c). This is assumed to be because the water contents of the developing roller and the toner particles are changeable in response to variations of the temperature and air moisture content. The charge distributions shown in FIGS. 29(a) and 29(b) ensure a proper development of a latent image, but the charge distribution shown in FIG. 29(c) do not, because the toner particles include positively-charged and low-level negatively charged parts, as shown by the hatchings in FIG. 29(c).

Accordingly, when the electrophotographic printer is used under high temperature and air moisture content conditions, the developing roller and the developer should be constituted in such a manner that the triboelectrification therebetween does not participate in the charging of the toner particles, as much as possible. This can be carried out by ensuring that the work functions of the developing roller and the developer conform with each other as much as possible. For example, by coating the polyurethane foam rubber developing roller with Teflon, it can be given the work function of 5.75 eV, as mentioned above, which is approximate to the work function of 5.60 eV as shown in FIG. 30. In this case, the charging of the toner particles may be actively carried out by the aluminum blade member having the work function of 4.41 eV, so that a charge distribution thereof is relatively stable regardless of variations of the temperature and air moisture content, as shown in FIGS. 31(a), 31(b), and 31(c). In particular, as apparent from these drawings, the charge distribution may be shifted slightly to the positive side in response to a raise in the temperature and air moisture content, but even though the temperature and air moisture content are raised to 32° C. and 80%, respectively, the charge distribution does not include positively charged toner particles.

Furthermore, according to the present invention, the developing roller 18, the blade member 20, and the developer may be constituted in such a manner that the work functions thereof approximate teach other, whereby the triboelectrification between the developing roller and blade member and the toner particles does not participate in the charging of the toner particles, as much as possible. In this case, the charging of the toner particles is carried out by the charge-injection effect resulting from the application of a bias voltage to the conductive blade member 20. For example, by coating the polyurethane foam rubber developing roller and the conductive rubber blade member with Teflon, and by using the polyester resin-based toner particles having the work function of 5.60 eV, the work functions thereof may approximate each other because the polyurethane foam rubber developing roller and the conductive rubber blade member can be given the work function of 5.75 eV by the Teflon coating, as mentioned above. When the work functions of the developing roller 18, the blade member 20, and the developer approximate each other, the charging of the toner particles can be substantially protected from the affect of variation of the temperature and air moisture content, and thus the charge distribution of the toner particles is made more stable. Note, in practice it is possible to give a charge of $-10\pm 1$ $\mu q/g$ to the toner particles when a bias voltage of $-200$ V is applied to the blade member.

According to the present invention, the charge-injection effect may be utilized in cooperation with the triboelectrification for charging the toner particles. When the charge-injection effect is utilized for charging the toner particles, a difference between the bias voltage applied to the blade member and the developing bias voltage applied to the developing roller should be within a predetermined range, because when the difference is small enough to allow the electrostatical adhesion of the toner particles to the blade member, an even formation of the developer layer around the developing roller may not be possible, and because when the difference is large enough to cause high electrical current or an electrical discharge between the blade member and the developing roller, not only the toner particles but also the developing roller may be fused due to generation of the Joule heat. For example, when the polyurethane foam rubber developing roller, the aluminum blade member, and the polyester resin based toner particles are used, the difference between the bias voltage applied to the blade member and the developing bias voltage applied to the developing roller should be within the range of from $-20$ to $-200$ volts, as shown in the following table.

| Voltage of Blade | Voltage Difference between Blade and Roller | Changes at Roller | Changes at Blade |
| --- | --- | --- | --- |
| $-650$ V | $-350$ V | Recesses Formed in Roller Surface by Fusion | Fused Toner Adhered to Blade |
| $-600$ V | $-300$ V | Fused Toner Adhered Like Film to Roller: Developing Density Lowered | None |
| $-550$ V | $-250$ V | Fused Toner Adhered Like Film to Roller: Developing Density Lowered | None |
| $-500$ V | $-200$ V | Fused Toner Being Slightly Adhered Like Film to Roller: Developing Density Not Lowered | None |
| $-450$ V | $-150$ V | Fused Toner Being Slightly Adhered Like Film to Roller: Developing Density Not Lowered | None |
| $-400$ V | $-100$ V | None | None |
| $-370$ V | $-70$ V | None | None |
| $-350$ V | $-50$ V | None | None |
| $-330$ V | $-30$ V | None | None |
| $-320$ V | $-20$ V | None | None |
| $-310$ V | $-10$ V | None | Toner Electrostatically Adhered to Blade |
| $-300$ V | 0 V | None | Toner Electrostatically Adhered to Blade |

As apparent from the table, when the voltage difference is more than $-350$ volts, not only the toner particles but also the developing roller are fused due to the discharge between the blade member and the developing roller, so that recesses are formed in the surface thereof. When the voltage difference is between $-300$ and $-250$ volts, the formation of the recesses can be prevented at the surface of the developing roller, but the fused toner particles are adhered like a film to the surface thereof so that the toner density of the development is lowered. When the voltage difference is between $-200$ and $-150$ volts, the fused toner particles is slightly adhered like a film to the surface of the developing roller, but the toner density of the development is not substantially affected thereby. When the voltage difference is less that $-10$ volts, the toner particles are electrostatically adhered to the blade member. Accordingly, when the polyurethane foam rubber developing roller, the aluminum blade member, and the polyester resin based toner particles are used, the voltage difference should be from −20 to −200 volts, preferably from −20 to −100 volts.

Another embodiment of the developing device for the non-magnetic type one-component developer is shown in FIG. 32, in which elements similar to those of FIG. 1 are indicated by the same reference numerals, and elements corresponding to those of FIG. 1 are indicated by the same reference numerals plus a prime. In FIG. 32, the photosensitive drum 14, the developing roller 18, and the toner-removing roller 24 may be arranged in the same manner as in FIG. 1, and the developing roller 18 is pressed against the photosensitive drum 14 at a given linear pressure by resiliently biasing the casing 12 toward the drum 14, so that the given contact or nip width can be obtained therebetween. The blade member 20' also may be arranged in the same manner as in FIG. 1, but it is diametrically engaged with the developing roller 18 so that it is resiliently pressed thereagainst to regulate the thickness of the developer layer formed around the developing roller. Note, in FIG. 1, the blade member 20 is tangentially engaged with the developing roller 18. The developing device of FIG. 32 is provided with a fur brush roller 26' instead of the paddle roller 26, which moves the toner particles toward the developing roller 18 and is rotated in the same direction as the developing roller 18. When the developing bias voltage of −500 volts is applied to the developing roller 18, a voltage of, for example, −600 volts, which is lower than the developing bias voltage, is applied to the fur brush roller 26', whereby the toner particles entrained by the fur brush roller 26' are electrostatically adhered to the developing roller 18.

FIG. 33 shows a modification of the embodiment shown in FIG. 32. This is identical to the developing device of FIG. 32 except that a roller member 54 is used instead of the blade member 20', to regulate the thickness of the developer layer formed around the developing roller 18. Similar to the blade member 20, the roller member 54 may be formed of a non-conductive or conductive rubber material, and preferably is coated with Teflon, and futher, may be formed of a suitable metal material such as aluminum, stainless steel, brass or the like. The roller member 54 is rotated in the same direction as the developing roller 18. In this modified embodiment, by varying a peripherical speed of the roller member 54 with respect to a peripheral speed of the developing roller 18, not only can the thickness of the developer layer be easily regulated, but also the triboelectrification can be caused between the roller member 54 and the developing roller 18.

FIG. 34 shows a further embodiment of the developing device for the non-magnetic type one-component developer. In this embodiment, the photosensitive drum 14 and the developing roller 18 are arranged in the same manner as in FIG. 1, but are rotated in the opposite directions, as indicated by arrows $A_{14}$ and $A_{15}$. In particular, the developing device of the FIG. 34 is characterized in that, during the rotation of the drum 14 and developing roller 18, the surfaces thereof move upward at the developing area where they are pressed against each other. Note, in the embodiments mentioned above, the drum and developing roller are rotated so that the surfaces thereof move downward at the developing area. The developing device of the FIG. 34 is also characterized in that the blade member 20, which may be constituted in the same manner as in FIG. 1, is positioned below the developing roller 18, to prevent a leakage of the toner particles from a space between the developing roller 18 and a bottom of the vessel 16, and that the bottom of the vessel 16 forms a steep slope descending toward the developing roller 18, so that the toner particles can be moved thereto by the force of gravity. Namely, according to this embodiment, it is possible to omit the toner-removing roller 24, the paddle roller 26 or fur brush roller 26', and the agitator 28, whereby the developing device can be given a conpact construction. Note, the toner-removing roller may be incorporated into the embodiment of FIG. 34, if necessary. Further Note, in FIG. 34, reference numeral 56 designates a portion of a frame structure of the electrophotographic printer, from which the casing 12 is suspended through the intermediary of guide roller elements 58, so that it can be moved toward and away from the photosensitive drum 14, whereby the developing roller 18 can be resiliently pressed thereagainst.

FIG. 35 shows, by way an example, an electrophotographic color printer having three developing devices 10Y, 10M, and 10C according to the present invention incorporated therein. These developing devices 10Y, 10M, and 10C are identical, and each device is arranged in substantially the same manner as the developing device of FIG. 1. Accordingly, in FIG. 35, elements similar to those of the developing device shown FIG. 1 are indicated by the same reference numerals. Namely, the developing devices 10Y, 10M, and 10C are distinguished from each other only in that yellow, magenta, and cyan non-magnetic type one-component developers are used in the developing devices 10Y, 10M, and 10C, respectively. Each of the developing devices 10Y, 10M, and 10C is supported in such a manner that it is movable between a developing position at which the developing roller 18 is resiliently pressed against the photosensitive drum 56 and a non-developing position at which the developing roller 18 is retracted from the developing position. Note, in FIG. 35, the developing device 10M is at the developing position, and the developing devices 10Y and 10C are both at the non-developing position.

As shown in FIG. 35, the color printer also comprises a photosensitive drum 56 having a larger diameter than that of the photosensitive drum 14, due to the arrangement of the three developing devices 10Y, 10M, and 10C therearound, and having the organic photoconductor (OPC) film as the photosensitive film. The color printer also comprises a charger 58, which may be a corona discharger, for producing a uniform distribution of negative charges on the photosensitive drum 56, and a laser beam scanner 60 for writing an electrostatic latent image on the charged area of the photosensitive drum 56. The laser beam scanner 60 includes a laser beam generator 60a such as a semiconductor laser device for emitting a laser beam LB, and a polygon mirror 60b for deflecting the laser beam LB to scan the drum surface with the deflected laser beam. During the scanning operation, the laser beam LB is intermittently emitted on the basis of color (yellow, magenta, and cyan) video data obtained from a word processor, a microcomputer or the like, whereby the electrostatic latent image is formed as a dot image on the drum surface. The electrostatic latent images formed on the basis of the yellow, magenta, and cyan video data are developed by the developing devices 10Y, 10M, and 10C, respectively.

The color printer further comprises a transfer drum 62, which may be made of a mesh metal sheet material, disposed in the vicinity of the photosensitive drum 56. The transfer drum 62 and the photosensitive drum 56 are rotated in reverse directions with respect to each other, as indicated by arrows $A_{14}$ and $A_{15}$ in FIG. 35. The transfer drum 62 is provided with a transfer charger 62a, which may be a corona discharger, disposed inside thereof and facing the rotating photosensitive drum 56 through the intermediary of the rotating transfer charger 62a. The color printer also comprises two sheet supply trays 64 and 66 in which two stack of sheets or papers having different sizes, such as B5 and A4, are received, respectively. The sheet supply trays 64, 66 are provided with a pickup rollers 64a, 66a by which a sheet or paper having a given size (B5, A4) is drawn out one by one therefrom. For example, the A4 paper drawn out from the tray 66 is moved toward a pair of feed rollers 68, by which the paper is then fed to the transfer drum 62. The transfer drum 62 is provided with suitable gripper elements (not shown) for holding the fed paper around the surface thereof. The transfer charger 62a gives a positive charge to the paper held by the transfer drum 62, whereby the developed (yellow, magenta, and cyan) image is electrostatically transferred from the photosensitive drum 62 to the paper. The residual toner particles not transferred to the paper are removed from the surface of the photosensitive drum 62 by a cleaner 70 having a pair of fur brush rollers 70a, and the cleaned surface of the drum 62 is illuminated by a lamp 72, to eliminate the charge thereform, and then given a negative charge by the charger 58 to again produce a uniform distribution of the negative charge thereon. Note, reference 73 indicates a travel path of the paper between the sheet supply trays 64 and 66 and the transfer drum 62.

In the color printing operation of the color printer, for example, first, an electrostatic latent image is written on the charged area of the photosensitive drum 56 by the laser beam scanner 60, on the basis of the yellow color video data obtained from a word processor, a microcomputer or the like, and is then developed with the yellow color developer of the developing device 10Y moved to the developing position; the developing devices 10M and 10C being at the non-developing position. Thereafter, the yellow color developed toner image is transferred by the transfer charger 62a to the paper held by the transfer drum. Successively, an electrostatic latent image is written on the charged area of the photosensitive drum 56 by the laser beam scanner 60 on the basis of the magenta color video data, and is then developed with the magenta color developer of the developing device 10M moved to the developing position; the developing devices 10Y and 10C being at the non-developing position. Thereafter, the magenta color developed image is transferred by the transfer charger 62a to the paper held by the transfer drum 62, so that the magenta color transferred image is superimposed on the yellow color image transferred to the paper held by the transfer drum 62. Furthermore, an electrostatic latent image is written on the charged area of the photosensitive drum 56 by the laser beam scanner 60 on the basis of the cyan color video data, and is then developed with the cyan color developer of the developing device 10C moved to the developing position; the developing devices 10Y and 10M being at the non-developing position. Thereafter, the cyan color developed image is transferred by the transfer charger 62a to the paper held by the transfer drum 62, so that the cyan color transferred image is superimposed on the yellow and magenta color images transferred to the paper held by the transfer drum 62, whereby a multi-color image can be obtained on the paper.

The paper carrying the multi-color image is then conveyed from the transfer drum 62 toward a toner image fixing device 74 including a heat roller 74a and a backup roller 74b. In particular, the toner particles forming the multi-color image are heat-fused by the heat roller 74a so that the multi-color image is heat-fixed on the paper. The paper carrying the fixed image is then moved to a paper-receiving tray 76 by a pair feed rollers 78. Note, in FIG. 35, reference numerals 78 and 80 indicate a guide member and a conveyer belt forming a travel path of the paper between the transfer drum 62 and the toner image fixing device 74.

Although the embodiments of the present invention are explained in relation to a photosensitive drum, they can be also applied to a dielectric drum on which the electrostatic latent image can be formed. Further, although the developing device according to the present invention is used for the non-magnetic type one-component developer, the magnetic type one-component developer may be also used, if necessary.

Finally, it will be understood by those skilled in the art that the foregoing description is of preferred embodiments of the present invention, and that various changes and modifications can be made thereto without departing from the spirit and scope thereof.

We claim:

1. A developing device using a one-component developer, which device comprises:

a vessel for holding a one-component developer composed of toner particles;

a developing roller rotatably provided within said vessel in such a manner that a portion of said developing roller is exposed therefrom and faces the surface of an electrostatic latent image carrying body; and said developing roller being formed of a conductive open-cell foam rubber material so that pore openings appear over a surface of said developing roller, said pore openings having a diameter which is at most twice an average diameter of the toner particles, whereby during a rotation of said developing roller, the toner particles are captured and held by the pore openings of said developing roller to form a developer layer therearound and are carried to the surface of said electrostatic latent image carrying body.

2. A developing device as set forth in claim 1, wherein said conductive open-cell foam rubber material of which said developing roller is formed is selected from the group consisting of a conductive open-cell foam polyurethane rubber material, a conductive open-cell foam silicone rubber material, and a conductive open-cell foam acrylonitorile-butadiene rubber material.

3. A developing device as set forth in claim 1, wherein said developing roller is resiliently pressed against the surface of said electrostatic latent image carrying body, and has an Asker C-hardness of at most 50°, preferably 35°, whereby the operating life of said electrostatic latent image carrying body can be prolonged.

4. A developing device as set forth in claim 1, further comprising a developer layer regulating means provided within said vessel and resiliently engaged with said developing roller for regulating a thickness of the developer layer formed around said developing roller, said developing roller having an Asker C-hardness of at most 50°, preferably 35°, and said developer layer regulating means is formed of a metal material selected from the group consisting of aluminum, stainless steel, and brass, whereby variations of the developer layer thickness regulated by said developer layer regulating means can be reduced.

5. A developing device as set forth in claim 1, wherein said conductive open-cell foam rubber material of which said developing roller is formed is a conductive open-cell foam polyurethane rubber material, whereby a resolution of a developed image can be maintained at a high level and over a long period.

6. A developing device as set forth in claim 1, wherein said conductive open-cell foam rubber material of which said developing roller is formed is a conductive open-cell foam polyurethane rubber material which is neutral with regard to frictional electrification, whereby the toner particles can be given a desired charge distribution by utilizing a triboelectrification between said developing roller and the toner particles.

7. A developing device using a one-component developer, which device comprises:
   a vessel for holding a one-component developer composed of toner particles;
   a developing roller rotatably provided within said vessel in such a manner that a portion of said developing roller is exposed therefrom and faces the surface of an electrostatic latent image carrying body;
   said developing roller being formed of a conductive open-cell foam rubber material so that pore openings appear over a surface of said developing roller, whereby during a rotation of said developing roller, the toner particles are captured and held by the pore openings of said developing roller to form a developer layer therearound and are carried to the surface of said electrostatic latent image carrying body; and
   the pore opening or porous cells of said developing roller being in communication with each other through fine passages formed among said porous cells, said fine passages having a diameter which is at most twice an average diameter of the toner particles.

8. A developing device as set forth in claim 7, wherein said conductive open-cell foam rubber material of which said developing roller is formed is selected from the group consisting of a conductive open-cell foam polyurethane rubber material, a conductive open-cell foam silicone rubber material, and a conductive open-cell foam acrylonitorile-butadiene rubber material.

9. A developing device as set forth in claim 7, wherein said developing roller is resiliently pressed against the surface of said electrostatic latent image carrying body, and has an Asker C-hardness of at most 50°, preferably 35°, whereby the operating life of said electrostatic latent image carrying body can be prolonged.

10. A developing device as set forth in claim 7, further comprising a developer layer regulating means provided within said vessel and resiliently engaged with said developing roller for regulating a thickness of the developer layer formed around said developing roller, said developing roller having an Asker C-hardness of at most 50°, preferably 35°, and said developer layer regulating means is formed of a metal material selected from the group consisting of aluminum, stainless steel, and brass, whereby variations of the developer layer thickness regulated by said developer layer regulating means can be reduced.

11. A developing device as set forth in claim 7, wherein said conductive open-cell foam rubber material of which said developing roller is formed is a conductive open-cell foam polyurethane rubber material, whereby a resolution of a developed image can be maintained at a high level and over a long period.

12. A developing device as set forth in claim 7, wherein said conductive open-cell foam rubber material of which said developing roller is formed is a conductive open-cell foam polyurethane rubber material which is neutral with regard to frictional electrification, whereby the toner particles can be given a desired charge distribution by utilizing a triboelectrification between said developing roller and the toner particles.

13. A developing device using a one-component developer, comprising:
   a vessel for holding a one-component developer composed of toner particles;
   a developing roller rotatably provided within said vessel in such a manner that a portion of said developing roller is exposed therefrom and faces the surface of an electrostatic latent image carrying body;
   said developing roller being formed of a conductive rubber material by which the toner particles are entrained to form a developer layer therearound and are carried to the surface of said electrostatic latent image carrying body; and
   a developer layer regulating means provided within said vessel and resiliently engaged with said developing roller for regulating a thickness of the developer layer formed around said developing roller,
   wherein said developing roller is constituted such that a work function thereof approximates that of the toner particles, so that the toner particles are charged by a triboelectrification between said developer layer regulating means and the toner particles, whereby the toner particles can be given a desired charge distribution regardless of variations of temperature and air moisture content.

14. A developing device as set forth in claim 13, wherein said conductive rubber material of which said developing roller is formed is a conductive open-cell foam rubber material so that pore openings appear over a surface of said developing roller, said pore openings having a diameter which is at most twice an average diameter of the toner particles so that the toner particles are captured and held by the pore openings of said developing roller.

15. A developing device as set forth in claim 14, wherein said conductive open-cell foam rubber material of which said developing roller is formed is selected from the group consisting of a conductive open-cell foam polyurethane rubber material, a conductive open-cell foam silicone rubber material, and a conductive open-cell foam acrylonitorile-butadiene rubber material.

16. A developing device as set forth in claim 14, wherein said developing roller is resiliently pressed against the surface of said electrostatic latent image carrying body, and has an Asker C-hardness of at most 50°, preferably 35°, whereby the operating life of said electrostatic latent image carrying body can be prolonged.

17. A developing device as set forth in claim 14, wherein said developing roller has an Asker C-hardness of at most 50°, preferably 35°, and said developer layer regulating means is formed of a metal material selected from the group consisting of aluminum, stainless steel, and brass, whereby variations of the developer layer thickness regulated by said developer layer regulating means can be reduced.

18. A developing device as set forth in claim 14, wherein said conductive open-cell foam rubber material of which said developing roller is formed is a conductive open-cell foam polyurethane rubber material, whereby a resolution of a developed image can be maintained at a high level and over a long period.

19. A developing device using a one-component developer, which device comprises:
a vessel for holding a one-component developer composed of toner particles;
a developing roller rotatably provided within said vessel in such a manner that a portion of said developing roller is exposed therefrom and faces the surface of an electrostatic latent image carrying body;
said developing roller being formed of a conductive rubber material by which the toner particles are entrained to form a developer layer therearound and are carried to the surface of said electrostatic latent image carrying body; and
a developer layer regulating means provided within said vessel and resiliently engaged with said developing roller for regulating a thickness of the developer layer formed around said developing roller,
wherein when the toner particles are charged by a triboelectrification between said developing roller and developer layer regulating means and the toner particles, said developing roller and developer layer regulating means are constituted in such a manner that a relationship of work functions $W_1$ and $W_2$ thereof and a work function $W_3$ of the toner particles is defined by the following formula:

$$(W_1 - W_3) \times (W_2 - W_3) > 0$$

whereby the toner particles can be given a desired distribution.

20. A developing device as set forth in claim 19, wherein said conductive rubber material of which said developing roller is formed is a conductive open-cell foam rubber material so that pore openings appear over a surface of said developing roller, said pore openings having a diameter which is at most twice an average diameter of the toner particles so that the toner particles are captured and held by the pore openings of said developing roller.

21. A developing device as set forth in claim 20, wherein said conductive open-cell foam rubber material of which said developing roller is formed is selected from the group consisting of a conductive open-cell foam polyurethane rubber material, a conductive open-cell foam silicone rubber material, and a conductive open-cell foam acrylonitorile-butadiene rubber material.

22. A developing device as set forth in claim 20, wherein said developing roller is resiliently pressed against the surface of said electrostatic latent image carrying body, and has an Asker C-hardness of at most 50°, preferably 35°, whereby the operating life of said electrostatic latent image carrying body can be prolonged.

23. A developing device as set forth in claim 20, wherein said developing roller has an Asker C-hardness of at most 50°, preferably 35°, and said developer layer regulating means is formed of a metal material selected from the group consisting of aluminum, stainless steel, and brass, whereby variations of the developer layer thickness regulated by said developer layer regulating means can be reduced.

24. A developing device as set forth in claim 20, wherein said conductive open-cell foam rubber material of which said developing roller is formed is a conductive open-cell foam polyurethane rubber material, whereby a resolution of a developed image can be maintained at a high level and over a long period.

25. A developing device using a one-component developer, comprising:
a vessel for holding a one-component developer composed of toner particles;
a developing roller rotatably provided within said vessel in such a manner that a portion of said developing roller is exposed therefrom and faces the surface of an electrostatic latent image carrying body;
said developing roller being formed of a conductive rubber material by which the toner particles are entrained to form a developer layer therearound and are carried to the surface of said electrostatic latent image carrying body; and
a developer layer regulating means provided within said vessel and resiliently engaged with said developing roller for regulating a thickness of the developer layer formed around said developing roller,
wherein said developer layer regulating means is formed of a conductive material for applying a bias voltage thereto to prevent the toner particles from being electrostatically adhered to said developer layer regulating means, and wherein said developing roller and said developer layer regulating means are constituted in such a manner that work functions thereof approximate that of the toner particles, so that the toner particles are charged by a charge-injection effect resulting from the application of the bias voltage to said developer layer regulating means, whereby the toner particles can be given a desired charge distribution regardless of variations of temperature and air moisture content.

26. A developing device as set forth in claim 25, wherein said conductive rubber material of which said developing roller is formed is a conductive open-cell foam rubber material so that pore openings appear over a surface of said developing roller, said pore openings having a diameter which is at most twice an average diameter of the toner particles so that the toner particles are captured and held by the pore openings of said developing roller.

27. A developing device as set forth in claim 26, wherein said conductive open-cell foam rubber material of which said developing roller is formed is selected from the group consisting of a conductive open-cell foam polyurethane rubber material, a conductive open-cell foam silicone rubber material, and a conductive open-cell foam acrylonitorile-butadiene rubber material.

28. A developing device as set forth in claim 26, wherein said developing roller is resiliently pressed against the surface of said electrostatic latent image carrying body, and has an Asker C-hardness of at most 50°, preferably 35°, whereby the operating life of said electrostatic latent image carrying body can be prolonged.

29. A developing device as set forth in claim 26, wherein said developing roller has an Asker C-hardness of at most 50°, preferably 35°, and said developer layer regulating means is formed of a metal material selected from the group consisting of aluminum, stainless steel, and brass, whereby variations of the developer layer thickness regulated by said developer layer regulating means can be reduced.

30. A developing device as set forth in claim 26, wherein said conductive open-cell foam rubber material of which said developing roller is formed is a conductive open-cell foam polyurethane rubber material, whereby a resolution of a developed image can be maintained at a high level and over a long period.

31. A developing device using a one-component developer, comprising:
a vessel for holding a one-component developer composed of toner particles;
a developing roller rotatably provided within said vessel in such a manner that a portion of said developing roller is exposed therefrom and faces the surface of an electrostatic latent image carrying body;
said developing roller being formed of a conductive rubber material by which the toner particles are entrained to form a developer layer therearound and are carried to the surface of said electrostatic latent image carrying body; and
a developer layer regulating means provided within said vessel and resiliently engaged with said developing roller for regulating a thickness of the developer layer formed around said developing roller,
wherein said developer layer regulating means is formed of a conductive material for applying a bias voltage thereto to prevent the toner particles from being electrostatically adhered to said developer layer regulating means, and wherein a charge-injection effect resulting from the application of the bias voltage to said developer layer regulating means and a triboelectrification between said developing roller and/or developer layer regulating means and the toner particles are utilized for charging the toner particles.

32. A developing device as set forth in claim 31, wherein said conductive rubber material of which said developing roller is formed is a conductive open-cell foam rubber material so that pore openings appear over a surface of said developing roller, said pore openings having a diameter which is at most twice an average diameter of the toner particles so that the toner particles are captured and held by the pore openings of said developing roller.

33. A developing device as set forth in claim 32, wherein said conductive open-cell foam rubber material of which said developing roller is formed is selected from the group consisting of a conductive open-cell foam polyurethane rubber material, a conductive open-cell foam silicone rubber material, and a conductive open-cell foam acrylonitorile-butadiene rubber material.

34. A developing device as set forth in claim 32, wherein said developing roller is resiliently pressed against the surface of said electrostatic latent image carrying body, and has an Asker C-hardness of at most 50°, preferably 35°, whereby the operating life of said electrostatic latent image carrying body can be prolonged.

35. A developing device as set forth in claim 32, wherein said developing roller has an Asker C-hardness of at most 50°, preferably 35°, and said developer layer regulating means is formed of a metal material selected from the group consisting of aluminum, stainless steel, and brass, whereby variations of the developer layer thickness regulated by said developer layer regulating means can be reduced.

36. A developing device as set forth in claim 32, wherein said conductive open-cell foam rubber material of which said developing roller is formed is a conductive open-cell foam polyurethane rubber material, whereby a resolution of a developed image can be maintained at a high level and over a long period.

37. A developing device using a one-component developer, which device comprises:
a vessel for holding a one-component developer composed of toner particles;
a developing roller rotatably provided within said vessel in such a manner that a portion of said developing roller is exposed therefrom and faces the surface of an electrostatic latent image carrying body;
said developing roller being formed of a conductive rubber material by which the toner particles are entrained to form a developer layer therearound and are carried to the surface of said electrostatic latent image carrying body; and
a developer layer regulating means provided within said vessel and resiliently engaged with said developing roller for regulating a thickness of the developer layer formed around said developing roller,
wherein said developer layer regulating means is formed of a conductive material for applying a bias voltage thereto to prevent the toner particles from being electrostatically adhered to said developer layer regulating means; and when a charge-injection effect resulting from the application of the bias voltage to said developer layer regulating means is utilized for charging the toner particles, a difference between the bias voltage applied to said developer layer regulating means and a developing bias voltage applied to said developing roller is less than a level at which a high electrical current or an electrical discharge occurs between said developer layer regulating means and said developing roller.

38. A developing device as set forth in claim 37, wherein said conductive rubber material of which said developing roller is formed is a conductive open-cell foam rubber material so that pore openings appear over a surface of said developing roller, said pore openings having a diameter which is at most twice an average diameter of the toner particles so that the toner particles are captured and held by the pore openings of said developing roller.

39. A developing device as set forth in claim 38, wherein said conductive open-cell foam rubber material of which said developing roller is formed is selected from the group consisting of a conductive open-cell foam polyurethane rubber material, a conductive open-cell foam silicone rubber material, and a conductive open-cell foam acrylonitorile-butadiene rubber material.

40. A developing device as set forth in claim 38, wherein said developing roller is resiliently pressed against the surface of said electrostatic latent image carrying body, and has an Asker C-hardness of at most 50°, preferably 35°, whereby the operating life of said electrostatic latent image carrying body can be prolonged.

41. A developing device as set forth in claim 38, wherein said developing roller has an Asker C-hardness of at most 50°, preferably 35°, and said developer layer regulating means is formed of a metal material selected from the group consisting of aluminum, stainless steel, and brass, whereby variations of the developer layer thickness regulated by said developer layer regulating means can be reduced.

42. A developing device as set forth in claim 38, wherein said conductive open-cell foam rubber material of which said developing roller is formed is a conductive open-cell foam polyurethane rubber material, whereby a resolution of a developed image can be maintained at a high level and over a long period.

43. A developing device as set forth in claim 13, wherein said developer layer regulating means comprises a blade member resiliently pressed against said developing roller.

44. A developing device as set forth in claim 43, wherein said blade member is positioned below said developing roller to prevent a leakage of the toner particles from a space between said developing roller and a bottom of said vessel.

45. A developing device as set forth in claim 13, wherein said developer layer regulating means comprises a roller member is resiliently pressed against said developing roller.

46. A developing device as set forth in claim 19, wherein said developer layer regulating means comprises a blade member resiliently pressed against said developing roller.

47. A developing device as set forth in claim 46, wherein said blade member is positioned below said developing roller to prevent a leakage of the toner particles from a space between said developing roller and a bottom of said vessel.

48. A developing device as set forth in claim 19, wherein said developer layer regulating means comprises a roller member is resiliently pressed against said developing roller.

49. A developing device as set forth in claim 25, wherein said developer layer regulating means comprises a blade member resiliently pressed against said developing roller.

50. A developing device as set forth in claim 49, wherein said blade member is positioned below said developing roller to prevent a leakage of the toner particles from a space between said developing roller and a bottom of said vessel.

51. A developing device as set forth in claim 25, wherein said developer layer regulating means comprises a roller member is resiliently pressed against said developing roller.

52. A developing device as set forth in claim 31, wherein said developer layer regulating means comprises a blade member resiliently pressed against said developing roller.

53. A developing device as set forth in claim 52, wherein said blade member is positioned below said developing roller to prevent a leakage of the toner particles from a space between said developing roller and a bottom of said vessel.

54. A developing device as set forth in claim 31, wherein said developer layer regulating means comprises a roller member is resiliently pressed against said developing roller.

55. A developing device as set forth in claim 37, wherein said developer layer regulating means comprises a blade member resiliently pressed against said developing roller.

56. A developing device as set forth in claim 55, wherein said blade member is positioned below said developing roller to prevent a leakage of the toner particles from a space between said developing roller and a bottom of said vessel.

57. A developing device as set forth in claim 37, wherein said developer layer regulating means comprises a roller member is resiliently pressed against said developing roller.

* * * * *